United States Patent
Taguchi et al.

(10) Patent No.: US 6,954,687 B2
(45) Date of Patent: Oct. 11, 2005

(54) METHOD AND SYSTEM FOR REGISTERING ID INFORMATION FOR EACH TRANSMITTER, AND METHOD AND SYSTEM FOR IDENTIFYING RESPECTIVE TRANSMITTERS, APPLICABLE TO A PNEUMATIC TIRE PRESSURE MONITORING SYSTEM, A PNEUMATIC TIRE PRESSURE MONITORING APPARATUS, AND RELEVANT PNEUMATIC TIRE PRESSURE MONITORING PROGRAM

(75) Inventors: Akihiro Taguchi, Oobu (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 45 days.

(21) Appl. No.: 10/645,636

(22) Filed: Aug. 22, 2003

(65) Prior Publication Data

US 2004/0044450 A1 Mar. 4, 2004

(30) Foreign Application Priority Data

Aug. 26, 2002 (JP) ........................................ 2002-245916

(51) Int. Cl.[7] .............................................. R60C 23/00
(52) U.S. Cl. .......................... 701/29; 701/32; 340/447; 73/146.2
(58) Field of Search .............................. 701/29, 36, 32, 701/35; 340/445, 446, 447, 448; 73/146.2

(56) References Cited

U.S. PATENT DOCUMENTS

| | | | |
|---|---|---|---|
| 5,612,671 A | | 3/1997 | Mendez et al. |
| 6,215,390 B1 | * | 4/2001 | Lin ........................ 340/323 R |
| 6,385,511 B1 | | 5/2002 | Fondeur et al. |
| 2002/0070876 A1 | * | 6/2002 | Hirohama et al. ..... 340/870.07 |
| 2002/0130771 A1 | * | 9/2002 | Osborne et al. ............ 340/438 |
| 2003/0000296 A1 | * | 1/2003 | Schmitt ....................... 73/146 |

FOREIGN PATENT DOCUMENTS

| | | |
|---|---|---|
| JP | 2774959 | 4/1998 |
| JP | A-2003-154824 | 5/2003 |
| JP | A-2003-154825 | 5/2003 |
| JP | A-2003-165317 | 6/2003 |
| JP | A-2003-306016 | 10/2003 |
| WO | WO 00/34062 | 6/2000 |

* cited by examiner

Primary Examiner—Michael J. Zanelli
(74) Attorney, Agent, or Firm—Posz Law Group, PLC

(57) ABSTRACT

Each transmitter transmits temperature/pressure data of an associated tire together with an ID assigned to each transmitter. A pneumatic tire pressure monitoring apparatus receives the temperature/pressure data, and inputs traveling condition specifying data which specifies traveling conditions of the vehicle. Then, the pneumatic tire pressure monitoring apparatus identifies IDs assigned to the transmitters of respective tires actually installed on vehicle wheels of its own vehicle based on the temperature/pressure data and the traveling condition specifying data, and registers the identified IDs into a memory of the pneumatic tire pressure monitoring apparatus.

40 Claims, 9 Drawing Sheets

METHOD AND SYSTEM FOR REGISTERING
ID INFORMATION FOR EACH
TRANSMITTER, AND METHOD AND
SYSTEM FOR IDENTIFYING RESPECTIVE
TRANSMITTERS, APPLICABLE TO A
PNEUMATIC TIRE PRESSURE
MONITORING SYSTEM, A PNEUMATIC
TIRE PRESSURE MONITORING
APPARATUS, AND RELEVANT PNEUMATIC
TIRE PRESSURE MONITORING PROGRAM

BACKGROUND OF THE INVENTION

This invention relates to a method and system for registering transmitter identifications (IDs) in a pneumatic tire pressure monitoring system, also relates to a method and system for identifying transmitters, and further relates to a pneumatic tire pressure monitoring system and its apparatus, and also relates to a pneumatic tire pressure monitoring program.

A pneumatic tire pressure monitoring system is conventionally known as including a plurality of transmitters incorporating pressure sensors attached to respective tires of an automotive vehicle as well as a receiver provided in a vehicle body for receiving a radio signal carrying pressure data transmitted from each transmitter. The conventional pneumatic tire pressure monitoring system has the capability of detecting abnormal reduction in the air pressure of each tire based on the pressure data sent from the associated transmitter. According to this conventional pneumatic tire pressure monitoring system, the receiver stores individual IDs assigned to the transmitters attached to the tires belonging to its own vehicle. When a transmitter signal is received, the receiver executes ID checking for discriminating the signals sent from the transmitters attached to the tires of its own vehicle from signals sent from transmitters attached to tires of other vehicles.

In general, an automotive vehicle is equipped with a total of five tires including a spare tire. Among these five tires, the spare tire requires no monitoring of air pressure to be performed by the pneumatic tire pressure monitoring system. In other words, the monitoring operation by the pneumatic tire pressure monitoring system should be executed for the remaining four tires actually installed on vehicle wheels. To this end, the objectives for ID registration are limited to the tires actually installed on the vehicle wheels. In an event that any one of four actually driven tires is punctured and replaced by the spare tire, the ID assigned to the punctured tire is deleted and withdrawn from registration while the ID assigned to the spare tire is newly registered as one of registered IDs.

Reregistering the IDs is time-consuming and complicated for a worker or a user who replaces the punctured tire by the spare tire. In some cases, the worker may forget or fail to register the transmitter ID of the spare tire to the receiver. In this case, the pneumatic tire pressure monitoring system cannot operate properly due to miss or failure in registering the transmitter ID of the spare tire.

To eliminate this drawback, it may be possible that all of transmitter IDs of five tires including the spare tire is registered in advance in the receiver register. However, in this case, another problem occurs unless the transmitter ID of the punctured tire is deleted from the objectives of the monitoring. Namely, the pneumatic tire pressure monitoring system will continuously generate a warning based on the pressured data sent from the transmitter associated with the punctured tire. Thus, the warning does not stop even after the punctured tire is replaced by the spare tire. In other words, it was inevitably required to reregister the transmitter IDs of the tires actually installed on the vehicle wheels after the exchange of tires is finished.

Japanese Patent No. 2774959, corresponding to the U.S. Pat. No. 5,612,671, discloses a low tire pressure warning system which has a learning capability of automatically registering the transmitter IDs of the tires. According to this system, the receiver has an ID check table listing the transmitter IDs of four tires belonging to its own vehicle. An ID received together with pressure data is compared with the registered IDs in the table to judge whether or not the received pressure data originate from any one of the transmitters attached to the tires of its own vehicle. The presence of any abnormality in the tire pressure is judged based on the received pressure data. And, a warning is generated when the abnormality is found. If a new ID is received together with normal pressure data, the receiver adds the newly received ID into the ID check table. On the contrary, when no signal is received from the transmitter having one of the registered IDs, the ID of this transmitter is deleted from the ID check table.

According to above prior art, the warning system will serve for automatically registering the transmitter IDs of four rotating or driven tires actually installed on vehicle wheels only when a spare tire is accommodated in a trunk room of a sedan-type car because the trunk room can provide sufficient shielding against radio waves. In other words, the system cannot operate as intended when it is installed in an RV-type car which mounts a spare tire on the outer surface (usually, on the rear door) of a vehicle body. If a punctured tire is mounted on the back of the RV-type car, the abnormal pressure signal will be continuously transmitted from the punctured tire to the receiver. According, the warning operation will be erroneously continued.

SUMMARY OF THE INVENTION

In view of the above-described problems, the present invention has a first object to realize accurate and reliable identification of tires actually installed on vehicle wheels not only in a sedan-type car but also in a RV-type car, thereby surely eliminating erroneous warning being executed based on a signal transmitted from a punctured tire replaced with a spare tire and temporarily fixed or placed to the position wherein the spare tire was accommodated.

A second object of the present invention is to realize automatic ID registration of the transmitters attached to the tires actually installed on vehicle wheels.

A third object of the present invention is to realize automatic identification for discriminating objective signals sent from the transmitters attached to the tires actually installed on vehicle wheels of its own vehicle from a non-objective signal sent from a transmitter attached to other vehicle's tire or from a transmitter attached to a spare tire belonging to this vehicle.

In order to accomplish the above first and second objects, the present invention provides a method for registering identifications (IDs) of transmitters associated with respective tires of its own vehicle to a memory of a pneumatic tire pressure monitoring apparatus provided in a vehicle body. According to this transmitter ID registering method, each transmitter transmits variable data of an associated tire together with an ID assigned to each transmitter. The variable data have the nature varying between a moment the vehicle is traveling and a moment the vehicle is stopped. The pneumatic tire pressure monitoring apparatus receives the variable data, and inputs traveling condition specifying data which specifies traveling conditions of the vehicle. Then, the pneumatic tire pressure monitoring apparatus identifies IDs assigned to the transmitters of respective tires actually installed on vehicle wheels based on the variable data and the traveling condition specifying data, and registers the identified IDs into the memory of the pneumatic tire pressure monitoring apparatus.

For example, the variable data include the tire temperature. When a vehicle is traveling, an inner wall of each rotating tire is subjected to repetitive flexing. The tire temperature increases in accordance with the frequency of such flexing. Thus, it becomes possible to judge whether or not an objective tire is installed on a vehicle wheel. The volume of a tire is substantially constant regardless of tire temperature. Accordingly, as apparent from the Boyle-and-Charles' law, the tire pressure increases with increasing temperature when the vehicle is traveling. In this respect, the variable data of this invention include both of tire temperature and tire pressure.

The increasing pattern of tire temperature is dependent on the traveling speed of the vehicle. The temperature increase is steep when the traveling speed is high. The tire temperature at the moment a predetermined time has elapsed since the vehicle started traveling becomes high with increasing traveling speed. Accordingly, in discriminating respective transmitters, it is preferable to take the traveling conditions in addition to temperature data into consideration. For example, other vehicle may pass by a monitoring apparatus mounting vehicle due to traveling speed difference therebetween. In this case, a receiver installed in the monitoring apparatus mounting vehicle may receive a signal sent from a transmitter attached to a tire of this passing vehicle. In such a case, by considering the traveling conditions, it is possible to discriminate the signal sent from a transmitter equipped to a tire of its own vehicle from the signal sent from other vehicle.

Furthermore, the force acting on a tire is variable depending on the acceleration of vehicle. The acceleration pattern is relevant to the temperature increasing pattern. In this respect, the traveling conditions of the present invention include both of the traveling speed and the acceleration of the vehicle. In general, the data representing the traveling speed and the acceleration are frequently used in other electronic control devices, such as engine control unit, transmission control unit, and auto-cruising control unit. Thus, these data can be also used for the pneumatic tire pressure monitoring system of the present invention.

According to the transmitter ID registering method of the present invention, it becomes possible to automatically judge whether or not a received signal originates from a transmitter of a tire installed on a vehicle wheel of its own vehicle. Hence, a transmitter ID of a spare tire or a transmitter ID of a tire belonging to other vehicle is not erroneously registered. As a result, according to the transmitter ID registering method of the present invention, it becomes possible to eliminate erroneous warning being executed based on a signal transmitted from a punctured tire replaced with the spare tire and temporarily fixed or placed to the position wherein the spare tire was accommodated even in a RV-type car. The above-described functions and effects are similarly obtained when the tire pressure is used as the variable data. In other words, the same functions and effects can be obtained as far as the variable data have the nature changing in response to rotation of the tire.

Preferably, the process of identifying IDs assigned to transmitters of the tires actually installed on the vehicle wheels is executed after a predetermined time has elapsed since the vehicle started traveling. The effect of eliminating erroneous registration is enhanced. The predetermined time can be changed in reverse proportion to the traveling speed. For example, the predetermined time is set to be long for low traveling speed and short for high traveling speed.

In order to accomplish the above third object, the present invention provides a method for identifying transmitters associated with respective tires actually installed on vehicle wheels of its own vehicle among a plurality of transmitters prepared for tires of the vehicle. According to the transmitter identifying method of the present invention, each transmitter transmits variable data of an associated tire together with an identification (ID) assigned to each transmitter. The variable data have the nature varying between a moment the vehicle is traveling and a moment the vehicle is stopped. A receiver provided in a vehicle body receives the variable data and the ID, and inputs traveling condition specifying data which specifies traveling conditions of the vehicle. Then, the transmitters associated with the tires actually installed on the vehicle wheels are identified based on the variable data and the ID as well as based on the traveling condition specifying data.

Preferably, the variable data of the associated tire include at least one of temperature and pressure of the associated tire. The traveling condition specifying data include at least one of traveling speed and acceleration of the vehicle.

According to the transmitter identifying method of the present invention, the IDs of the transmitters attached to the tires installed on the vehicle wheels can be surely identified. The pneumatic tire pressure monitoring system can accurately execute the warning operation. This method requires no ID re-registration when a punctured tire is replaced by a spare tire. It becomes possible to prevent the warning operation from being erroneously continued.

In order to accomplish the above first and second objects, the present invention provides a system for registering identifications (IDs) of transmitters associated with respective tires of a vehicle to a memory of a pneumatic tire pressure monitoring apparatus provided in a vehicle body. The transmitter ID registering system of this invention includes a variable data transmitting means, provided in each transmitter, for transmitting variable data of the associated tire together with an ID assigned to each transmitter. The variable data have the nature varying between a moment the vehicle is traveling and a moment the vehicle is stopped. A variable data receiving means is provided for receiving a signal carrying the variable data transmitted from the variable data transmitting means. A traveling condition specifying data inputting means is provided for inputting traveling condition specifying data which specifies traveling conditions of the vehicle. An ID identifying means is provided for identifying IDs assigned to the transmitters of respective tires actually installed on vehicle wheels based on the signal received by the variable data receiving means and the traveling condition specifying data entered by the traveling condition specifying data inputting means. And, an ID registering means is provided for registering the IDs identified by the ID identifying means into the memory of the pneumatic tire pressure monitoring apparatus.

Preferably, the variable data of the associated tire include at least one of temperature and pressure of the associated tire. The traveling condition specifying data include at least one of traveling speed and acceleration of the vehicle. The ID identifying means executes the processing of identifying IDs assigned to the transmitters of the tires actually installed on the vehicle wheels after a predetermined time has elapsed since the vehicle started traveling.

In order to accomplish the above third object, the present invention provides a system for identifying transmitters associated with respective tires actually installed on vehicle wheels of its own vehicle among a plurality of transmitters prepared for tires of the vehicle. The transmitter identifying system of the present invention includes a variable data transmitting means, provided in each transmitter, for transmitting variable data of an associated tire together with an identification (ID) assigned to each transmitter. The variable data having the nature varying between a moment the vehicle is traveling and a moment the vehicle is stopped. A variable data receiving means is provided for receiving a signal carrying the variable data transmitted from the variable data transmitting means. A traveling condition specifying data inputting means is provided for inputting traveling condition specifying data which specifies traveling conditions of the vehicle. And, a transmitter identifying means is provided for identifying the transmitters associated with the tires actually installed on the vehicle wheels based on the signal received by the variable data receiving means and the traveling condition specifying data entered by the traveling condition specifying data inputting means.

Preferably, the variable data of the associated tire include at least one of temperature and pressure of the associated tire. The traveling condition specifying data include at least one of traveling speed and acceleration of the vehicle.

In order to accomplish the above first and second objects, the present invention provides a first pneumatic tire pressure monitoring system including a plurality of transmitters, a memory, and a receiver. Each transmitter detects an air pressure of an associated tire and transmits the detected air pressure together with an identification (ID) assigned to this transmitter. The memory registers IDs assigned to transmitters of respective tires actually installed on vehicle wheels of its own vehicle. The receiver receives a signal transmitted from each transmitter. The receiver judges whether or not the received signal originates from any one of the transmitters associated with the tires actually installed on the vehicle wheels by comparing the ID contained in the received signal with the IDs registered in the memory. The receiver judges whether or not there is any abnormality occurring in the air pressure when the received signal originates from any one of the transmitters associated with the tires actually installed on the vehicle wheels. And, the receiver generates a warning when any abnormality occurs in the air pressure of the tires actually installed on the vehicle wheels. Each transmitter includes a variable data transmitting means for transmitting variable data of the associated tire together with the ID assigned to each transmitter. The variable data having the nature varying between a moment the vehicle is traveling and a moment the vehicle is stopped. A variable data receiving means is provided for receiving a signal carrying the variable data transmitted from the variable data transmitting means. A traveling condition specifying data inputting means is provided for inputting traveling condition specifying data which specifies traveling conditions of the vehicle. An ID identifying means is provided for identifying IDs assigned to the transmitters of the tires actually installed on the vehicle wheels based on the signal received by the variable data receiving means and the traveling condition specifying data entered by the traveling condition specifying data inputting means. And, an ID registering means is provided for registering the IDs identified by the ID identifying means into the memory.

According to the first pneumatic tire pressure monitoring system, it becomes possible to automatically identify the transmitters attached to the tires actually installed on the vehicle wheels of its own vehicle. Hence, it becomes possible to eliminate erroneous warning being executed based on a signal transmitted from a punctured tire replaced with the spare tire and temporarily fixed or placed to the position wherein the spare tire was accommodated even in a RV-type car. Furthermore, the registration of transmitter IDs of the tires actually installed on the vehicle wheels can be accurately executed.

Preferably, the ID identifying means identifies the IDs as being assigned to the transmitters of the tires actually installed on the vehicle wheels when the variable data received by the variable data receiving means are obtainable in a traveling condition corresponding to the traveling condition specifying data entered by the traveling condition specifying data inputting means. Preferably, the first pneumatic tire pressure monitoring system further includes a provisional ID registering means for registering the ID contained in the signal received by the variable data receiving means as a provisional ID when the vehicle is stopped. A provisional ID deleting means is provided for deleting the provisional ID in a case that the provisional ID disagrees with the IDs assigned to the transmitters of the tires actually installed on the vehicle wheels, according to judgment of the ID identifying means which is activated when the ID contained in the signal received by the variable data receiving means agrees with the provisional ID registered in the provisional ID registering means in a traveling condition of the vehicle. And, a provisional ID number judging means is provided for judging whether or not a predetermined number of provisional IDs are present. In this case, the ID registering means registers the predetermined number of provisional IDs as authorized IDs into the memory, when the presence of the predetermined number of provisional IDs is recognized by the provisional ID number judging means.

With this arrangement, it becomes possible to surely execute the pneumatic tire pressure monitoring processing based on only the signals sent from the transmitter IDs of the tires installed on the vehicle wheels of its own vehicle.

Preferably, the first pneumatic tire pressure monitoring system further includes an additional provisional ID deleting means for judging whether or not the variable data received by the variable data receiving means agree with data obtainable in a traveling condition of the vehicle when the ID received by the variable data receiving means agrees with the provisional ID registered by the provisional ID registering means in the traveling condition of the vehicle. The additional provisional ID deleting means counts the frequency in receiving the provisional ID during the traveling condition of the vehicle, when judged as the variable data received by the variable data receiving means disagree with the data obtainable in the traveling condition of the vehicle. And, the additional provisional ID deleting means deletes the provisional ID when a counting value reaches a predetermined number.

With this arrangement, it becomes possible to surely select and delete a provisional ID of the spare tire among a plurality of transmitter IDs prepared for the vehicle.

Preferably, the first pneumatic tire pressure monitoring system further includes a provisional ID weighting means for activating the ID identifying means when the ID contained in the signal received by the variable data receiving means agrees with the provisional ID registered by the provisional ID registering means in the traveling condition of the vehicle. The provisional ID weighting means increases a priority order of the provisional ID for authorized registration when the ID specifying means can identify the provisional ID as being assigned to one of the transmitters of the tires actually installed on the vehicle wheels. And, an elapsed time judging means is provided for judging whether or not a predetermined time has elapsed since the vehicle started traveling, when the presence of the predetermined number of provisional IDs is recognized by the provisional ID number judging means. In this case, the ID registering means registers a plurality of provisional IDs as authorized IDs into the memory considering the priority order as much as a total number of the tires actually installed on the vehicle wheels, when elapse of the predetermined time is recognized by the elapsed time judging means.

By introducing the priority order for the authorized registration, it becomes possible to surely eliminate erroneous registration of a transmitter ID of a tire belonging to other vehicle which may be running nearby.

In order to accomplish the above third object, the present invention provides a second pneumatic tire pressure monitoring system including a plurality of transmitters, a memory, and a receiver. Each transmitter detects an air pressure of an associated tire and transmits the detected air pressure together with an identification (ID) assigned to this transmitter. The memory registers IDs assigned to transmitters of respective tires actually installed on vehicle wheels of its own vehicle. The receiver receives a signal transmitted from each transmitter, and judges whether or not the received signal originates from any one of the transmitters associated with the tires actually installed on the vehicle wheels by comparing the ID contained in the received signal with the IDs registered in the memory. Then, the receiver judges whether or not there is any abnormality occurring in the air pressure when the received signal originates from any one of the transmitters associated with the tires actually installed on the vehicle wheels, and generates a warning when any abnormality occurs in the air pressure of the tires actually installed on the vehicle wheels. The transmitter includes a variable data transmitting means for transmitting variable data of the associated tire together with the ID assigned to this transmitter. The variable data having the nature varying between a moment the vehicle is traveling and a moment the vehicle is stopped. A variable data receiving means is provided for receiving a signal carrying the variable data transmitted from the variable data transmitting means. A traveling condition specifying data inputting means is provided for inputting traveling condition specifying data which specifies traveling conditions of the vehicle. And, a transmitter identifying means is provided for identifying the transmitters of the tires actually installed on the vehicle wheels based on the signal received by the variable data receiving means and the traveling condition specifying data entered by the traveling condition specifying data inputting means.

According to the second pneumatic tire pressure monitoring system, the signal sent from the transmitter attached to a tire actually installed on a vehicle wheel of its own vehicle can be surely discriminated from a signal sent from a transmitter of a spare tire or a signal sent from a tire of other vehicle.

Preferably, the second pneumatic tire pressure monitoring system further includes an excluding means for activating the transmitter identifying means when the ID contained in the signal received by the variable data receiving means agrees with any one of the IDs registered in the memory. The excluding means excludes the ID contained in the received signal from objectives of warning performed by the receiver when the variable data received by the variable data receiving means disagree with data obtainable in a traveling condition of the vehicle corresponding to the traveling condition specifying data entered by the traveling condition specifying data input means.

With this arrangement, it becomes possible to eliminate erroneous warning being executed based on a signal transmitted from a punctured tire replaced with the spare tire and temporarily fixed or placed to the position wherein the spare tire was accommodated.

Preferably, the second pneumatic tire pressure monitoring system further includes a setting means for activating the transmitter identifying means when the ID contained in the signal received by the variable data receiving means agrees with any one of the IDs registered in the memory. The setting means sets the ID contained in the received signal as an objective of warning performed by the receiver, when the variable data received by the variable data receiving means agree with data obtainable in a traveling condition of the vehicle corresponding to the traveling condition specifying data entered by the traveling condition specifying data input means.

With this arrangement, in an event that one of the tires installed on the vehicle wheels is punctured and replaced by a spare tire, the puncture tire is surely excluded from the warning objectives. Meanwhile, the spare tire installed on the vehicle wheel is added as one of the warning objectives.

Preferably, the variable data of the associated tire include at least one of temperature and pressure of the associated tire. The traveling condition specifying data include at least one of traveling speed and acceleration of the vehicle.

In order to accomplish the above first and second objects, the present invention provides a third pneumatic tire pressure monitoring system including receiving means for receiving air-pressure data and an identification (ID) transmitted from transmitters associated with respective tires of its own vehicle. A memory is provided for registering identifications (IDs) assigned to transmitters of respective tires belonging to the vehicle. A control means is provided for identifying air-pressure data of the tires belonging to the vehicle by comparing the ID received by the receiving means with the IDs registered in the memory. The control means judges whether or not there is any abnormality occurring in the air pressure of the respective tires belonging to the vehicle based on the identified air-pressure data, and generates a warning when any abnormality occurs in the air pressure of the tires belonging to the vehicle. The third pneumatic tire pressure monitoring system further includes a variable data receiving means for receiving a signal carrying variable data and ID transmitted from the transmitters. The variable data have the nature varying between a moment the vehicle is traveling and a moment the vehicle is stopped. A traveling condition specifying data inputting means is provided for inputting traveling condition specifying data which specifies traveling conditions of the vehicle. An ID identifying means is provided for identifying IDs assigned to the transmitters of the tires actually installed on vehicle wheels based on the signal received by the variable data receiving means and the traveling condition specifying data entered by the traveling condition specifying data inputting means. And, an ID registering means is provided for registering the IDs identified by the ID identifying means into the memory.

With this arrangement, in an event that one of the tires installed on the vehicle wheels is punctured and replaced by a spare tire, the puncture tire is surely excluded from the warning objectives. Meanwhile, the spare tire installed on the vehicle wheel is added as one of the warning objectives.

Preferably, the ID identifying means identifies the ID contained in the signal received by the variable data receiving means as one of the IDs assigned to the transmitters of the tires actually installed on the vehicle wheels, when the variable data received by the variable data receiving means agree with data obtainable in a traveling condition of the vehicle corresponding to the traveling condition specifying data entered by the traveling condition specifying data input means. The third pneumatic tire pressure monitoring apparatus further includes a provisional ID registering means for registering the ID contained in the signal received by the variable data receiving means as a provisional ID when the vehicle is stopped. A provisional ID deleting means is provided for deleting the provisional ID in a case that the provisional ID disagrees with the IDs assigned to the transmitters of the tires actually installed on the vehicle wheels, according to judgment of the ID identifying means which is activated when the ID contained in the signal received by the variable data receiving means agrees with the provisional ID registered in the provisional ID registering means in a traveling condition of the vehicle. And, a provisional ID number judging means is provided for judging whether or not a predetermined number of provisional IDs are present. In this case, the ID registering means registers the predetermined number of provisional IDs as authorized IDs into the memory, when the presence of the predetermined number of provisional IDs is recognized by the provisional ID number judging means.

With this arrangement, it becomes possible to surely delete the transmitter ID of a spare tire which is not actually installed on a vehicle wheel.

Preferably, the third pneumatic tire pressure monitoring system further includes an additional provisional ID deleting means for judging whether or not the variable data received by the variable data receiving means agree with data obtainable in a traveling condition of the vehicle, when the ID contained in the signal received by the variable data receiving means agrees with the provisional ID registered by the provisional ID registering means in the traveling condition of the vehicle. The additional provisional ID deleting means counts the frequency in receiving the provisional ID during the traveling condition of the vehicle, when judged as the variable data received by the variable data receiving means disagree with the data obtainable in the traveling condition of the vehicle. And, the additional provisional ID deleting means deletes the provisional ID when a counting value reaches a predetermined number.

With this arrangement, it becomes possible to surely delete the provisional ID corresponding to the spare tire when it is not actually installed on a vehicle wheel.

Preferably, the third pneumatic tire pressure monitoring system further includes a provisional ID weighting means for activating the ID identifying means when the ID contained in the signal received by the variable data receiving means agrees with the provisional ID registered by the provisional ID registering means in the traveling condition of the vehicle. The provisional ID weighting means increases a priority order of the provisional ID for authorized registration when the ID specifying means identified the provisional ID as being assigned to one of the transmitters of the tires actually installed on the vehicle wheels. An elapsed time judging means is provided for judging whether or not a predetermined time has elapsed since the vehicle started traveling, when the presence of the predetermined number of provisional IDs is recognized by the provisional ID number judging means. In this case, the ID registering means registers a plurality of provisional IDs as authorized IDs into the memory considering the priority order as much as a total number of the tires actually installed on the vehicle wheels, when elapse of the predetermined time is recognized by the elapsed time judging means.

By introducing the priority order for the authorized registration, it becomes possible to surely eliminate erroneous registration of a transmitter ID of a tire belonging to other vehicle which may be running nearby.

In order to accomplish the above third object, the present invention provides a fourth pneumatic tire pressure monitoring apparatus including a receiving means for receiving air-pressure data and identification (ID) transmitted from transmitters associated with respective tires of its own vehicle. A memory is provided for registering IDs assigned to transmitters of respective tires belonging to the vehicle. A control means is provided for identifying air-pressure data of the tires belonging to the vehicle by comparing the ID received by the receiving means with the IDs registered in the memory. The control means judges whether or not there is any abnormality occurring in the air pressure of the respective tires belonging to the vehicle based on the identified air-pressure data, and generates a warning when any abnormality occurs in the air pressure of the tires belonging to the vehicle. The fourth pneumatic tire pressure monitoring apparatus further includes a variable data receiving means for receiving a signal carrying variable data and ID transmitted from the transmitters. The variable data have the nature varying between a moment the vehicle is traveling and a moment the vehicle is stopped. A traveling condition specifying data inputting means is provided for inputting traveling condition specifying data which specifies traveling conditions of the vehicle. And, a transmitter identifying means is provided for identifying the transmitters of the tires actually installed on the vehicle wheels based on the signal received by the variable data receiving means and the traveling condition specifying data entered by the traveling condition specifying data inputting means.

With this arrangement, the signal sent from the transmitter attached to a tire actually installed on a vehicle wheel of its own vehicle can be surely discriminated from a signal sent from a transmitter of a spare tire or a signal sent from a tire of other vehicle.

Preferably, the fourth pneumatic tire pressure monitoring system further includes an excluding means for activating the transmitter identifying means when the ID contained in the signal received by the variable data receiving means agrees with any one of the IDs registered in the memory. The excluding means excludes the ID contained in the received signal from objectives of warning performed by the control means when the variable data received by the variable data receiving means disagree with data obtainable in a traveling condition of the vehicle corresponding to the traveling condition specifying data entered by the traveling condition specifying data input means.

With this arrangement, the puncture tire being removed from the vehicle wheel can be surely excluded from the warning objectives.

Preferably, the fourth pneumatic tire pressure monitoring system further includes a setting means for activating the transmitter identifying means when the ID contained in the signal received by the variable data receiving means agrees with any one of the IDs registered in the memory. The setting means sets the ID contained in the received signal as an objective of warning performed by the control means when the variable data received by the variable data receiving means agree with data obtainable in a traveling condition of the vehicle corresponding to the traveling condition specifying data entered by the traveling condition specifying data input means.

With this arrangement, in an event that one of the tires installed on the vehicle wheels is punctured and replaced by a spare tire, the puncture tire is surely excluded from the warning objectives. Meanwhile, the spare tire installed on the vehicle wheel is added as one of the warning objectives.

Preferably, the variable data include at least one of temperature and pressure of the associated tire. The traveling condition specifying data include at least one of traveling speed and acceleration of the vehicle.

In order to accomplish the above first and second objects, the present invention provides a first program executed in a computer constituting a control unit of a pneumatic tire pressure monitoring apparatus for monitoring the air pressure of tires -belonging to its own vehicle based on signals transmitted from transmitters associated with the tires. The first program includes the following steps. In a receiving step, a signal is received from each transmitter. In an identification (ID) checking step, it is judged whether or not an ID contained in the signal received from each transmitter agrees with an already registered ID, when the signal from each transmitter is received in the receiving step. In an air-pressure judging step, it is judged whether or not there in any abnormality in an air pressure of a tire equipped with each transmitter based on air-pressure data contained in the signal received from each transmitter, when agreement between the ID contained in the signal received from each transmitter and the already registered ID is recognized in the ID checking step. In a warning step, a predetermined warning operation is executed when any abnormality in the air pressure of the tire equipped with each transmitter is found in the air-pressure judging step. In a stopping condition judging step, it is judged whether or not the vehicle is stopped, when disagreement between the ID contained in the received signal and the already registered ID is recognized in the ID checking step. In a provisional ID registering step, the ID being judged as disagreeing with the already registered ID in the ID checking step is registered as a provisional ID, when stoppage of the vehicle is recognized in the stopping condition judging step. In a provisional ID judging step, it is judged whether or not the ID contained in the received signal agrees with the provisional ID, when traveling of the vehicle is recognized in the stopping condition judging step. In an increasing pattern judging step, it is judged whether or not at least one of pressure and temperature data contained in the received signal is in an increasing pattern, when agreement between the ID contained in the received signal and the provisional ID is recognized in the provisional ID judging step. In a traveling pattern agreement judging step, it is judged whether or not at least one of pressure and temperature data contained in the received signal agrees with an increasing pattern of at least one of temperature and pressure in a present traveling pattern of the vehicle, when the increasing pattern is recognized in the increasing pattern judging step. In a provisional ID number judging step, it is judged whether or not the number of provisional IDs agrees with a total number of the tires of the vehicle, when agreement between at least one of pressure and temperature data contained in the received signal and the increasing pattern of at least one of temperature and pressure in the present traveling pattern of the vehicle is recognized in the traveling pattern agreement judging step. And, in an authorized ID registering step, the provisional IDs are registered as authorized IDs when agreement between the number of the provisional IDs and the total number of the tires of the vehicle is recognized in the provisional ID number judging step.

Preferably, the first pneumatic tire pressure monitoring program further includes the following steps. In a weighting step, a priority order of the provisional ID for authorized registration is increased, when agreement between at least one of pressure and temperature data contained in the received signal and the increasing pattern of at least one of temperature and pressure in the present traveling pattern of the vehicle is recognized in the traveling pattern agreement judging step. And, in an elapsed time judging step, it is judged whether or not a predetermined time has elapsed since the vehicle started traveling, when disagreement between the number of the provisional IDs and the total number of the tires of the vehicle is recognized in the provisional ID number judging step. In this case, the authorized ID registering step includes a step of registering a plurality of provisional IDs as authorized IDs considering the priority order as much as a total number of tires actually installed on the vehicle wheels, when elapse of the predetermined time is recognized by the elapsed time judging step.

In order to accomplish the above third object, the present invention provides a second program executed in a computer constituting a control unit of a pneumatic tire pressure monitoring apparatus for monitoring the air pressure of tires belonging to its own vehicle based on signals transmitted from transmitters associated with the tires. The second program includes the following steps. In a receiving step, a signal is received from each transmitter. In an identification (ID) checking step, it is judged whether or not an ID contained in the signal received from each transmitter agrees with an already registered ID, when the signal from each transmitter is received in the receiving step. In an air-pressure judging step, it is judged whether or not there in any abnormality in an air pressure of a tire equipped with each transmitter based on air-pressure data contained in the signal received from each transmitter, when agreement between the ID contained in the signal received from each transmitter and the already registered ID is recognized in the ID checking step. In a warning step, a predetermined warning operation is executed, when any abnormality in the air pressure of the tire equipped with each transmitter is found in the air-pressure judging step. In a traveling condition judging step, it is judged whether or not the vehicle is traveling, when disagreement between the ID contained in the received signal and the already registered ID is recognized in the ID checking step. In an increasing pattern judging step, it is judged whether or not at least one of pressure and temperature data contained in the received signal is in an increasing pattern, when traveling of the vehicle is recognized in the traveling condition judging step. And, in a warning objective excluding step, the ID contained in the received signal is excluded from warning objectives in the warning step, when no increasing pattern of at least one of pressure and temperature data contained in the received signal is recognized in the increasing pattern judging step.

Preferably, the second program further includes the following steps. In a pattern agreement judging step, the increasing pattern judging step is executed when the ID contained in the received signal agrees with the already registered ID. Then, it is judged whether or not at least one of pressure and temperature data contained in the received signal agrees with an increasing pattern of at least one of temperature and pressure in a present traveling pattern of the vehicle, when the increasing pattern is recognized in at least one of pressure and temperature data contained in the received signal. And, in a warning object setting step, the ID contained in the received signal is set as one of warning objectives in the warning step, when at least one of pressure and temperature data contained in the received signal agrees with the increasing pattern of at least one of temperature and pressure in the present traveling pattern of the vehicle.

It is needless to say that, according to the present invention, the transmitters of the tires actually installed on the vehicle wheels can be accurately identified even in a case that some or all of the tires are replaced by brand-new ones or in a case that relocation of tire positions (which may be simply called as "tire rotation") is performed.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

Figure 1:
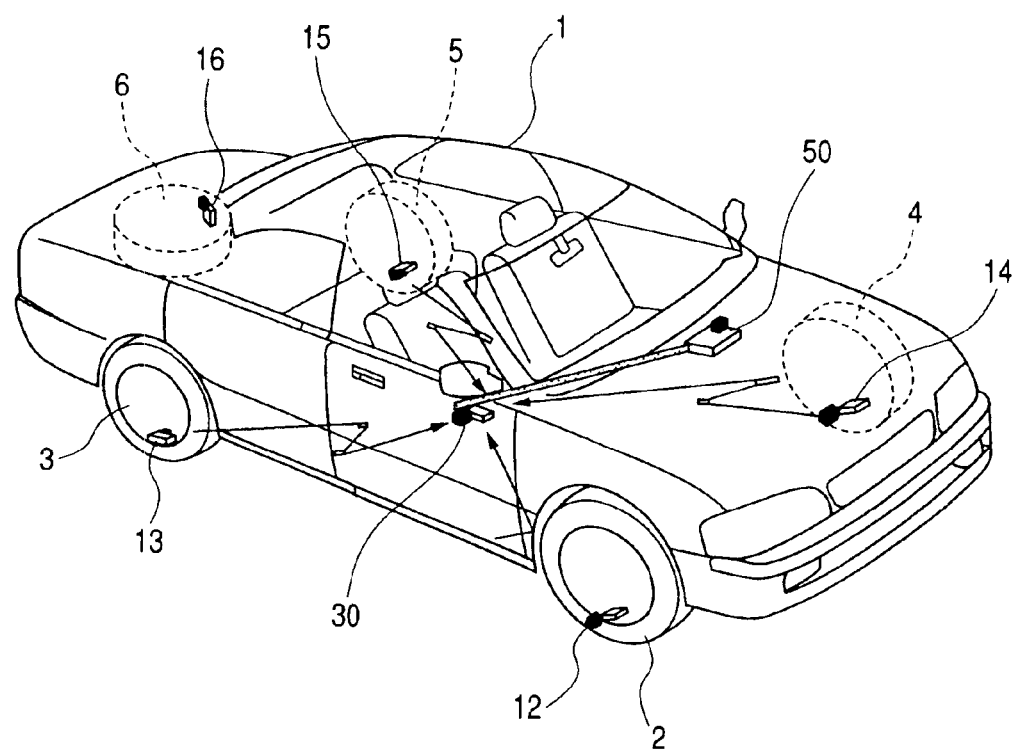
FIG. 1 is a perspective view showing an automotive vehicle having a pneumatic tire pressure monitoring system in accordance with a first embodiment of the present invention.

FIG. 1 shows an automotive vehicle 1 having a pneumatic tire pressure monitoring system in accordance with a first embodiment of the present invention. Four, i.e., front-right, rear-right, front-left, and rear-left, tires 2, 3, 4, and 5 are installed on vehicle wheels. According to a so-called 2WD type car, two of the vehicle wheels are connected to a drive axle linked to an output shaft of an engine and accordingly driven by the engine. The remaining two vehicle wheels are supported for free rotation. One spare tire 6 is placed in a trunk room of the vehicle. The tires 2, 3, 4, 5, and 6 are equipped with transmitters 12, 13, 14, 15, and 16, respectively. The transmitters 12, 13, 14, 15, and 16 have individual IDs assigned thereto so as to be discriminable from each other. The automotive vehicle 1 has a receiver (serving as a pneumatic tire pressure monitoring apparatus) 30 provided at substantially the center of its body floor. The receiver 30 receives radio signals carrying pressure data transmitted from four transmitters 12, 13, 14, and 15 of respective tires 2, 3, 4, and 5. The receiver 30 makes a judgment as to whether or not there is any tire having an abnormally low pneumatic tire pressure. Then, the receiver 30 causes a display unit 50 to generate a warning when there is any tire having an abnormally low pneumatic tire pressure.

Figure 2:
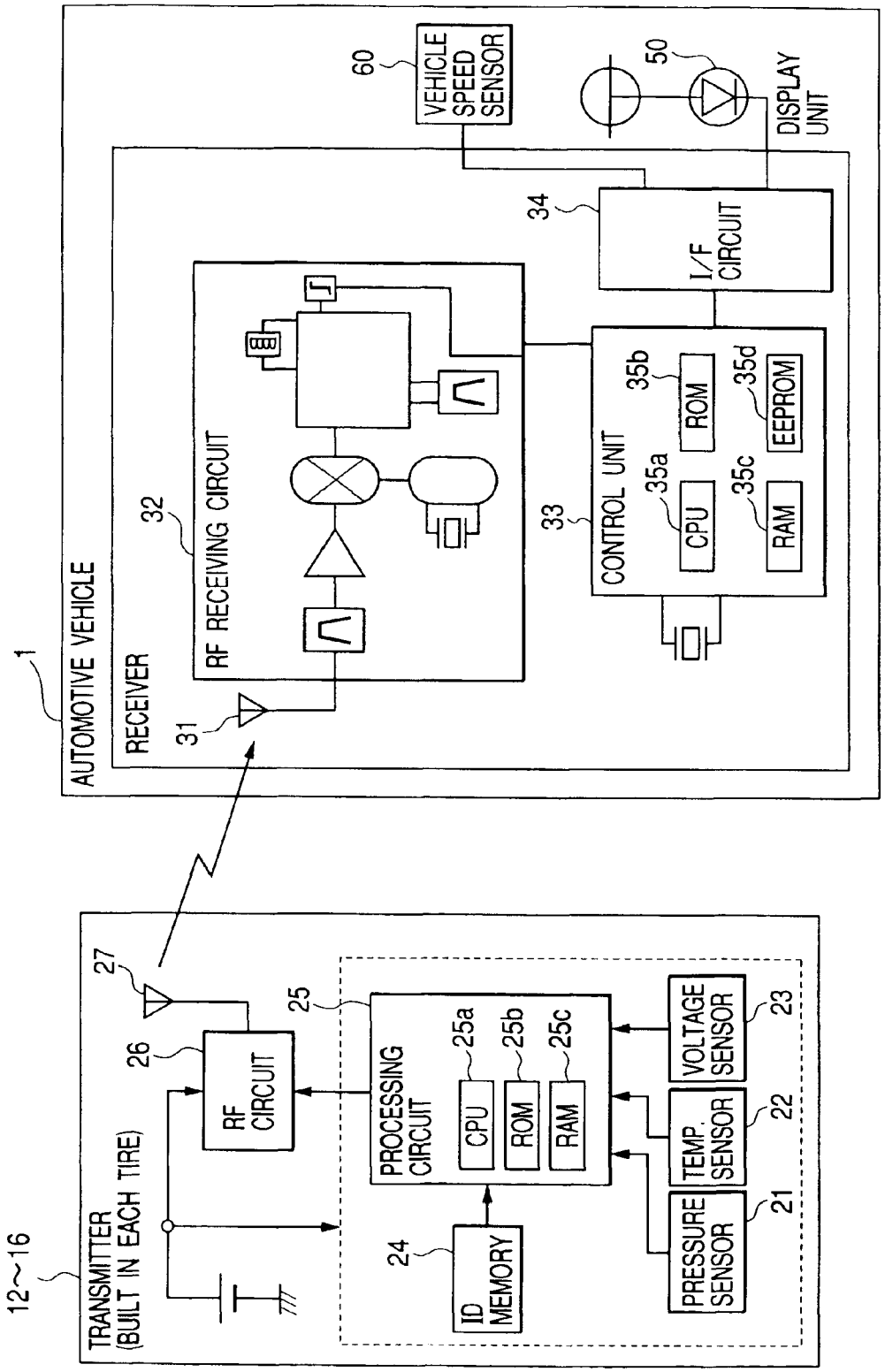
FIG. 2 is a block diagram showing the pneumatic tire pressure monitoring system and an associated transmitter in accordance with the first embodiment of the present invention.

The transmitters 12 to 16, being structurally identical with each other, have a pressure sensor 21, a temperature sensor 22, a voltage sensor 23, an ID memory 24, a processing circuit 25, a radio-frequency circuit 26, an antenna 27, and a power battery 28, as shown in FIG. 2.

The pressure sensor 21 detects the pneumatic pressure of an associated tire. The temperature sensor 22 detects the temperature of this tire. The voltage sensor 23, constituted by a piezoelectric element, detects a voltage generating in response to collision of a mobile object in accordance with rotation of a tire. Accordingly, no voltage is generated when the vehicle is stopped. A significant voltage is generated when the tire is rotating. The time interval between two generating voltages becomes short with increasing rotational speed. The ID memory 24 stores ID data inherent to respective transmitters 12 to 16. The processing circuit 25, constituted by a microcomputer incorporating CPU 25a, ROM 25b and RAM 25c, executes the processing for transmitting a signal carrying a combination of the data detected by the sensors 21 to 23 and inherent ID stored in the ID memory 24. The radio-frequency circuit 26 executes the radio or wireless transmitting/receiving operation.

The receiver 30, as shown in FIG. 2, includes an antenna 31, a radio-frequency receiving circuit 32, a control unit 33, and an interface circuit 34. The control unit 33 includes CPU 33a, ROM 33b, RAM 33c, and EEPROM 33d. EEPROM 33d stores authorized IDs of four transmitters 12 to 15 of respective tires 2 to 5 actually installed on the vehicle wheels. The processing for registering the IDs of respective transmitters 12 to 15 will be explained later. The interface circuit 34 outputs a warning display signal to the display unit 50. A vehicle speed sensor 60 generates a speed signal representing the traveling speed of the vehicle. The receiver 30 inputs the speed signal from the vehicle speed sensor 60 via the interface circuit 34.

Figure 3:
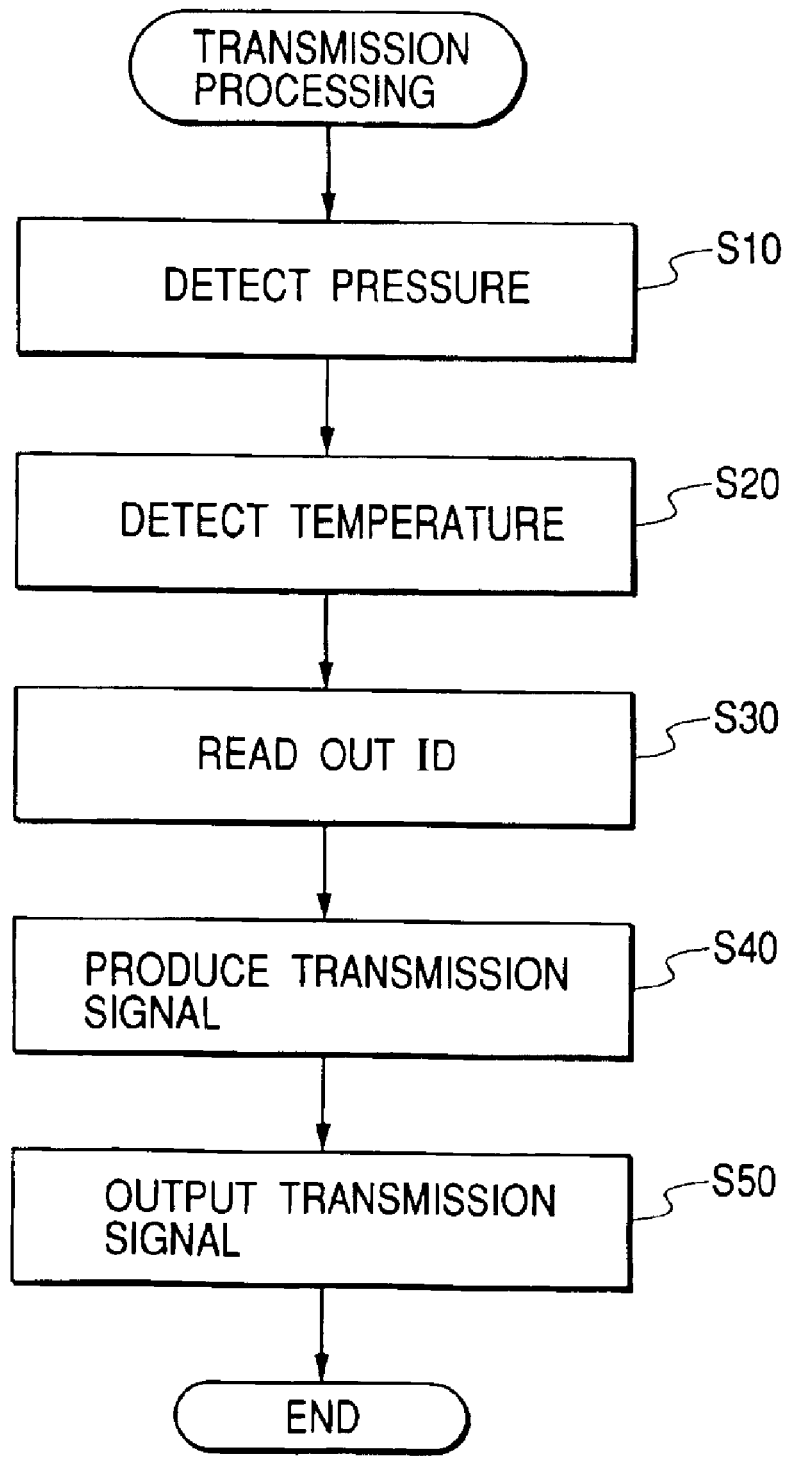
FIG. 3 is a flowchart showing the transmission processing executed by respective transmitters in accordance with the first embodiment of the present invention.

FIG. 3 is a flowchart showing the transmission processing executed by the processing circuit 25 of respective transmitters 12 to 16 in accordance with the first embodiment of the present invention. The software for executing the transmission processing shown in FIG. 3 is installed or stored in ROM 25b.

First, the processing circuit 25 causes the pressure sensor 21 to detect the air pressure of an associated tire (step S10). Then, the processing circuit 25 causes the temperature sensor 22 to detect the temperature of this tire (step S20). Next, the processing circuit 25 reads the ID from the ID memory 24 (step S30). Then, the processing circuit 25 produces a transmission signal carrying a combination of the detection data obtained in the steps S10 and S20 and the readout ID (step S40). Then, the processing circuit 25 causes the radio-frequency circuit 26 to output this transmission signal (step S50). When the automotive vehicle is traveling, the sequential processing of S10 to S50 is executed at the intervals of a first period of time (e.g., 10 seconds). On the other hand, when the automotive vehicle is stopped, the interval for executing the steps S10 to S50 is elongated compared with the first period of time. The processing circuit 25 makes a judgment based on a voltage value detected by the voltage sensor 23 as to whether or not the automotive vehicle is traveling. As described previously, the piezoelectric element generates no voltage when the automotive vehicle is stopped and generates a significant voltage when the automotive vehicle is traveling. Accordingly, when the voltage detected by the voltage sensor 23 exceeds a predetermined threshold, the processing circuit 25 presumes that the automotive vehicle is traveling and executes the above-described transmission processing (described by the steps S10 to S50) at the intervals of the first period of time. On the other hand, when the voltage detected by the voltage sensor 23 is less than the predetermined threshold, the processing circuit 25 presumes that the automotive vehicle is stopped and executes the above-described transmission processing at the intervals of a second period of time longer than the first period of time. This switching of the intervals for the transmission processing is effective for saving electric power consumed in the power battery 28.

Figure 4:
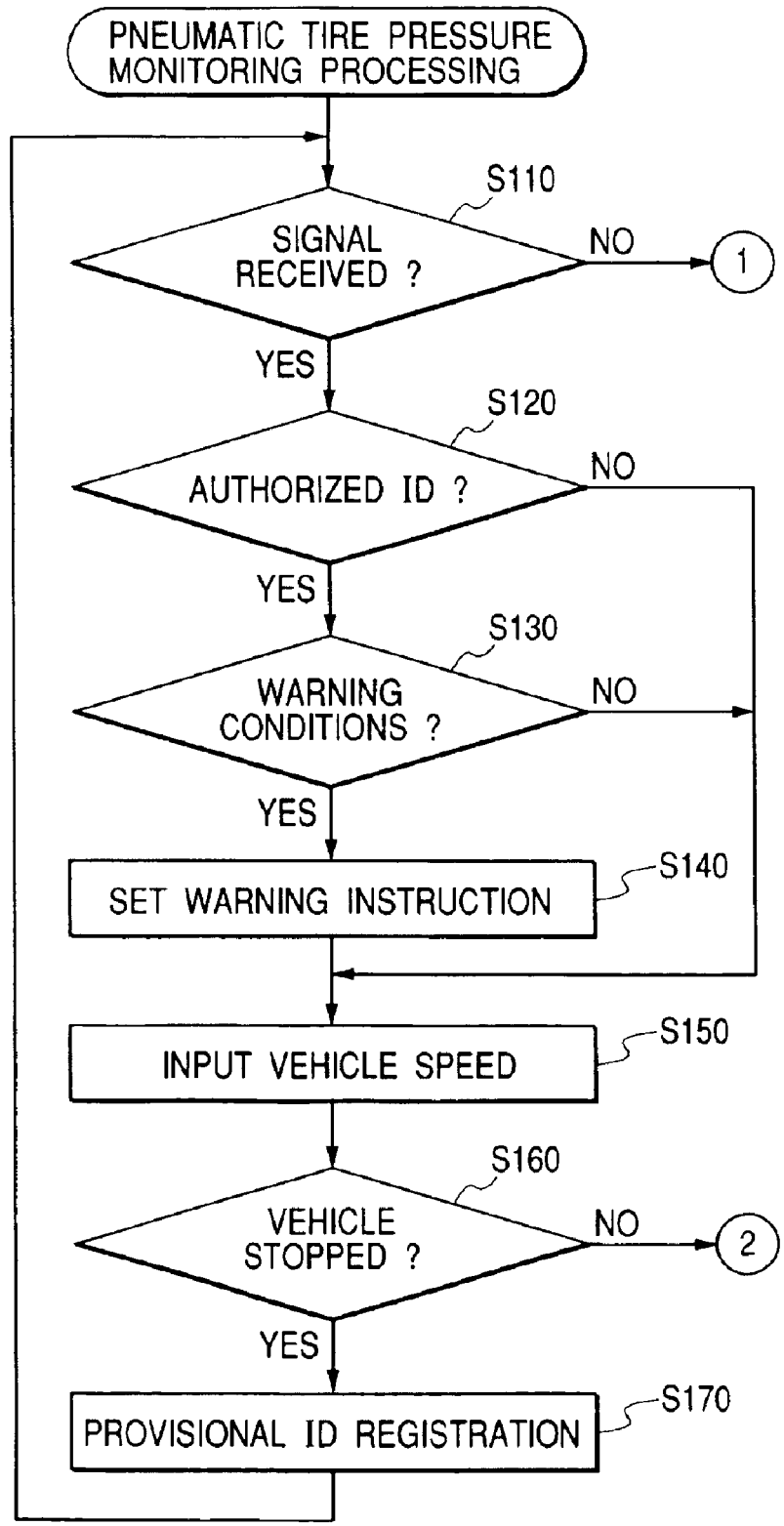
FIGS. 4 and 5 cooperatively show the pneumatic tire pressure monitoring processing in accordance with the first embodiment of the present invention.
Figure 5:
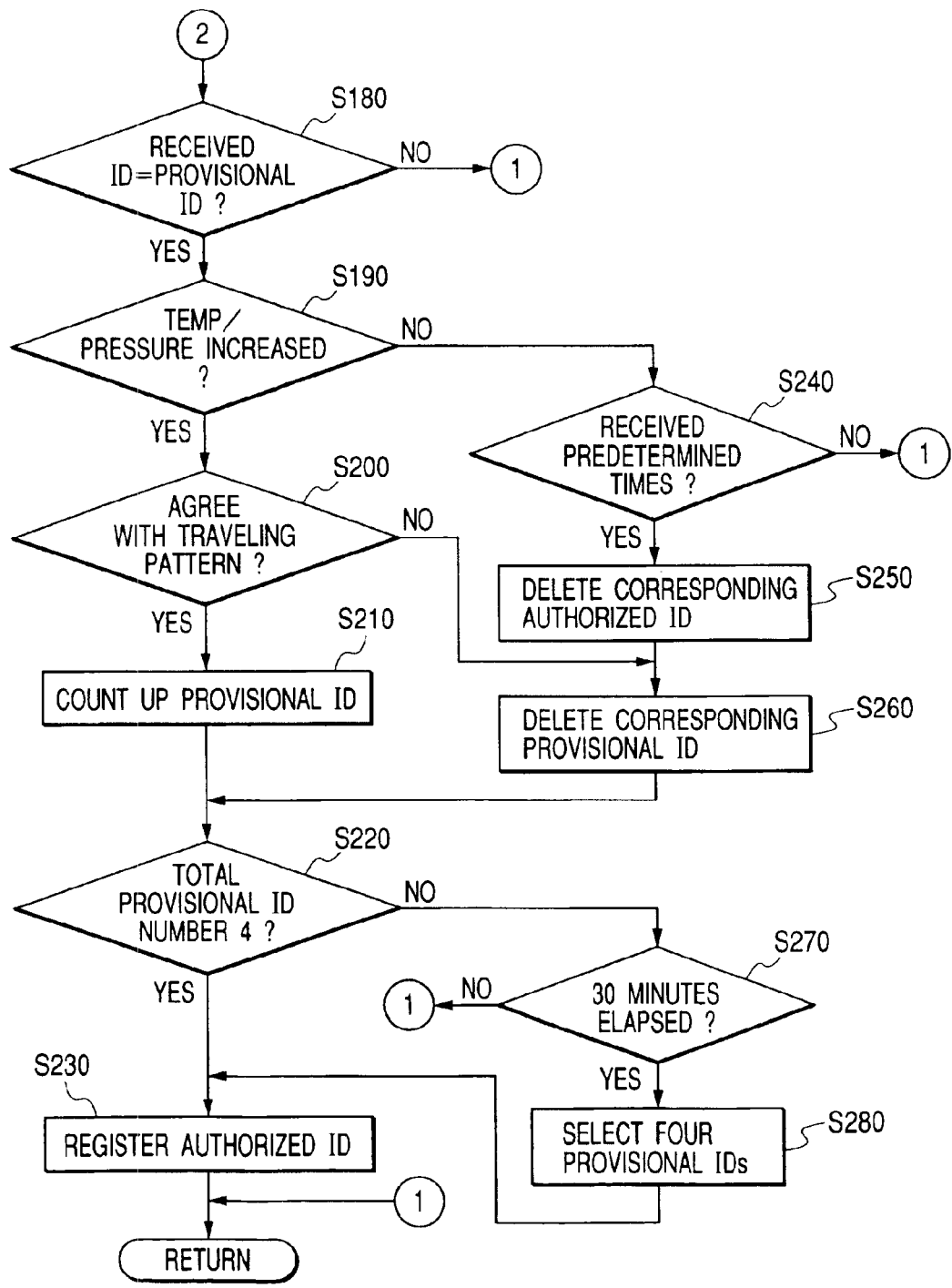

FIGS. 4 and 5 cooperatively show the pneumatic tire pressure monitoring processing executed by the control unit 33 of the receiver 30 in accordance with the first embodiment of the present invention. The software for executing the pneumatic tire pressure monitoring processing shown in FIGS. 4 and 5 is installed or stored in ROM 33*b*.

First, the control unit 33 makes a judgment as to whether or not a radio signal from the transmitter is received (step S110). When the radio signal is received from the transmitter (i.e., YES in step S110), the control unit 33 checks whether or not the ID contained in the received signal agrees with any one of authorized IDs stored in EEPROM 33*d* (step S120). When the received ID agrees with one of the authorized IDs, i.e., when the signal received in the step S110 originates from any one of transmitters attached to the tires actually installed on the vehicle wheels (YES in step S120), the control unit 33 checks whether or not the pressure data contained in the received signal fulfill the warning conditions (step S130). In this case, the warning conditions include a judgment as to whether or not the pressure data is in an abnormally low pressure level equivalent to that of a punctured tire. When the pressure data contained in the received signal fulfill the warning conditions (i.e., YES in step S130), the control unit 33 sets a warning instruction to the interface circuit 34 (step S140) and proceeds to the next step S150. The display unit 50 executes a warning display based on the warning instruction being set in the step S140, thereby informing a user of the presence of a punctured tire belonging to its own vehicle.

On the other hand, when no signal is received (i.e., NO in step S110), the control unit 33 immediately accomplishes this processing. When the received ID disagrees with the authorized IDs (i.e., NO in step S120), the control unit 33 skips the processing of steps S130 and S140 and proceeds to the step S150. Furthermore, when the pressure data contained in the received signal do not fulfill the warning conditions (i.e., NO in step S130), the control unit 33 skips the processing of step S140 and proceeds to the step S150. In the initial condition, EEPROM 33*d* stores no authorized ID. Accordingly, the judgment in step S120 becomes NO. The control unit 33 skips the processing of steps S130 and S140 and proceeds to the step S150.

In the step S150, the control unit 33 inputs the speed signal from the vehicle speed sensor 60. Then, the control unit 33 makes a judgment based on the detected vehicle speed as to whether or not the automotive vehicle 1 is stopped (step S160).

When the automotive vehicle is stopped (i.e., YES in step S160), the control unit 33 executes provisional registration for the received ID (step S170). The provisional ID is stored in the RAM 33*c*. Then, the control unit 33 accomplishes this processing.

In the shipping or delivering process of each automotive vehicle from the factory, the receiver 30 of the automotive vehicle 1 receives the signals transmitted from five transmitters 12 to 16 of the tires 2 to 6 prepared and belonging to this vehicle 1. Respective IDs of these five transmitters 12 to 16 are temporarily registered in the RAM 33*c*. Hereinafter, the ID being temporarily registered in this manner is referred to as "provisional ID." During the above-described provisional registration for the transmitter IDs, there is the possibility that the receiver 30 may erroneously receive the signals originating from other transmitters attached to tires of neighboring vehicles existing in an automobile assembly line, or in a stockyard for shipment, or in a showroom or at an exhibition lot in each dealer. Hence, the receiver 30 of a brand-new vehicle may store in RAM 33*c* unnecessary IDs of different vehicles in addition to the IDs of the transmitters attached to its own tires 2 to 6. In this manner, RAM 33*c* of each brand-new vehicle will possibly store unnecessary transmitter IDs of other vehicles.

Figure 6:
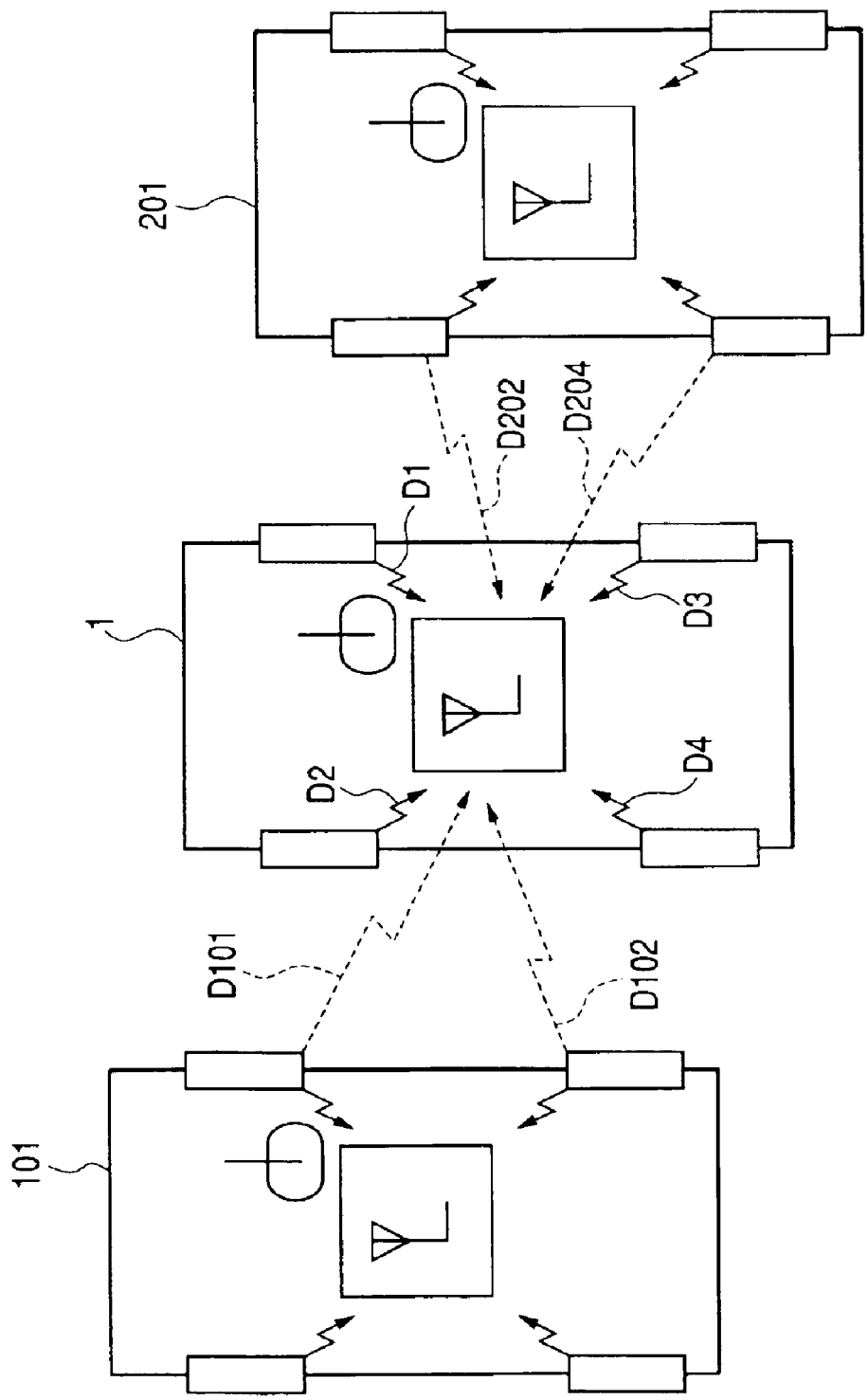
FIG. 6 is a view illustrating erroneous registration of transmitter IDs belonging to neighboring vehicles.

More specifically, as shown in FIG. 6, other vehicles 101 and 102 are often present in the vicinity of the subjective vehicle 1 mounting the receiver 30. In this condition, the receiver 30 may erroneously receive signals D101 and D102 transmitted from the transmitters of neighboring tires of one vehicle 101 as well as signals D203 and D204 transmitted from the transmitters of neighboring tires of the other vehicle 201. In this case, the receiver 30 possibly receives four other signals D101, D102, D203, and D204 in addition to the signals D1 to D4 transmitted from the tires of its own vehicle. In other words, the receiver 30 misrecognizes the signals D101, D102, D203, and D204 as if they originate from the tires of its own vehicle.

Meanwhile, when the automotive vehicle is traveling (i.e., NO in step S160), the control unit 33 proceeds to step S180 to check whether or not the provisional ID stored in RAM 33*c* agrees with the received ID (step S180). When the provisional ID agrees with the received ID (i.e., YES in step S180), the control unit 33 further checks whether or not the signal received in the step S110 shows increase in both the temperature data and the pressure data (step S190). When the received signal shows increase in both the temperature data and the pressure data (i.e., YES in step S190), the control unit 33 checks whether or not the increasing pattern of temperature and pressure agrees with the traveling pattern (step S200).

Figure 7:
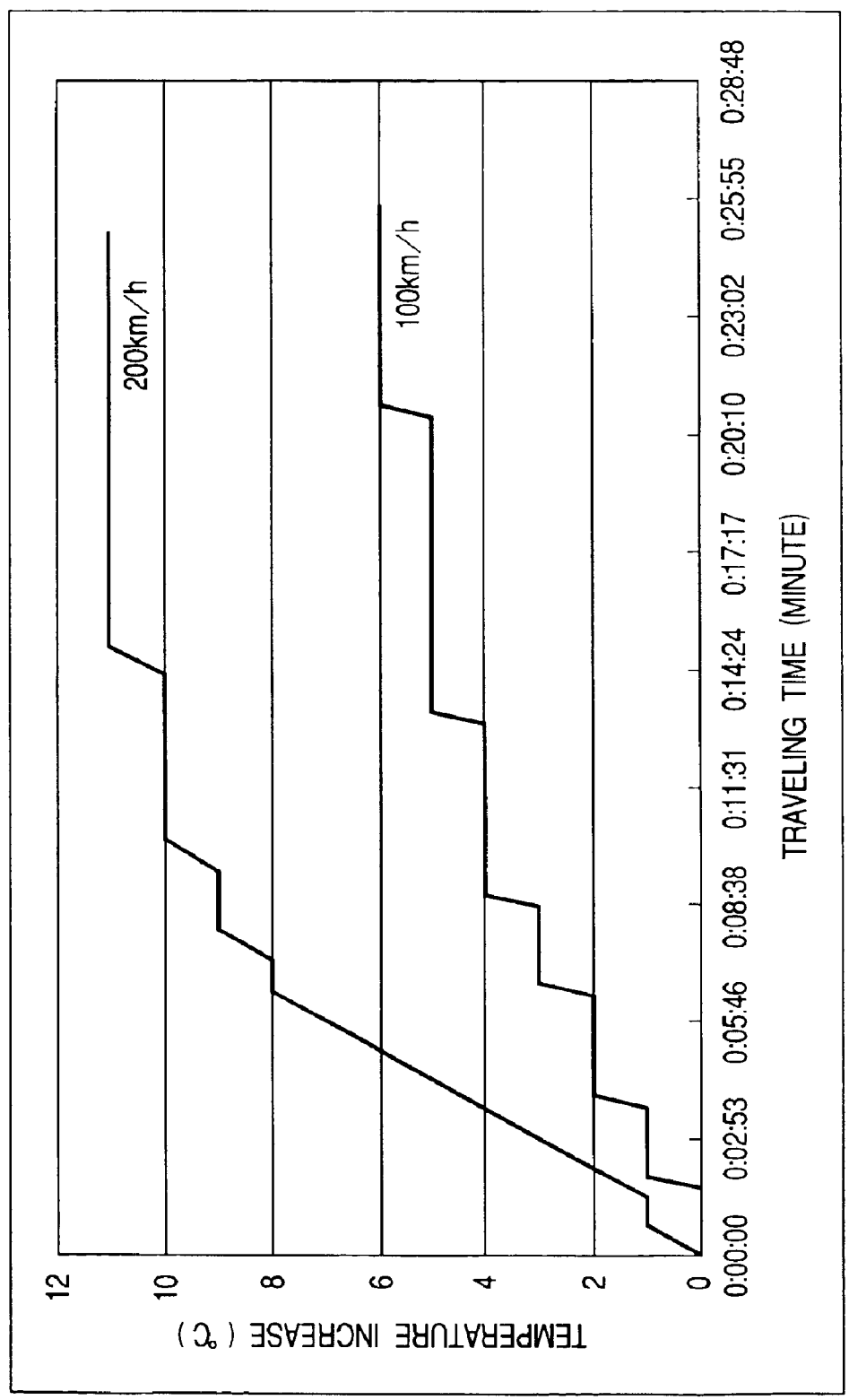
FIG. 7 is a graph showing the relationship between the traveling distance and the tire temperature at different vehicle speeds.

FIG. 7 shows an exemplary relationship between the traveling pattern and the temperature increasing pattern, as a result of simulation conducted by the inventors of this application. The tire temperature increases approximately 5° C. when the automotive vehicle is traveling at 100 km/h for approximately 20 minutes. On the other hand, the tire temperature increases approximately 10° C. when the automotive vehicle travels at 200 km/h for approximately 10 minutes. The temperature increase in the tire occurs due to repetitive flexing of an inner wall of the tire. The frequency of flexing increases in accordance with increase of the vehicle speed. Hence, as shown in FIG. 7, the tire temperature increases rapidly when the automotive vehicle travels at 200 km/h. As the volume of a tire is substantially constant, the tire pressure increases in relation to the temperature increase in the tire caused when the vehicle is traveling. This is apparent from the Boyle-and-Charles' law. Accordingly, the temperature increasing pattern resembles the traveling pattern. The temperature increasing pattern is not only dependent on the traveling speed but also dependent on an ambient temperature. For example, the tire temperature increases promptly in the summer. Accordingly, taking the influence of traveling speed and ambient temperature into consideration, it is preferable to prepare a database for the relationship among the traveling pattern, the temperature increasing pattern, and the pressure increasing pattern based on experimental data and simulation result. Such a database is stored in ROM 33b and is used for the judgment performed in the step S190.

When the temperature/pressure increasing pattern agrees with the traveling pattern (i.e., YES in step S200), the control unit 33 counts up the counter for the "provisional ID" which is identical with the counter for the "received ID" (step S210). Then, the control unit 33 checks whether or not the number of the "provisional IDs" stored in RAM 33c is 4 (step S220). When the number of the "provisional IDs is 4 (i.e., YES in step S220), all of the provisional IDs stored in RAM 33c is registered as authorized IDs into EEPROM 33d (step S230). The registration for the authorized transmitter IDs is executed by overwriting the information in the authorized ID memory region of EEPROM 33d. When the "authorized IDs" are already present before executing the step S230, these data are renewed by the transmitter IDs of four tires actually installed on the vehicle wheels.

On the other hand, when the "received ID" disagrees with the "provisional ID" (i.e., NO in step S180), the control unit 33 immediately accomplishes this processing. For example, when the receiver 30 of this vehicle 1 receives an ID of a foreign transmitter attached to other vehicle traveling nearby, the judgment in step S180 becomes NO.

When the signal received in the step S110 shows no increase in both the temperature data and the pressure data (i.e., NO in step S190), the control unit 33 checks whether or not this "received ID" has been received predetermined times (step S240). When this "receiving ID" has been received predetermined times (i.e. YES in step S240), the control unit 33 deletes the "authorized ID" agreeing with the "received ID" from the information stored in EEPROM 33d (step S250). Furthermore, the control unit 33 deletes the "provisional ID" corresponding to the "received ID" from RAM 33c (step S260).

The processing in the above-described steps S250 and S260 is executed for the spare tire 6.

More specifically, the spare tire 6 does not rotate when the automotive vehicle is traveling. The signal transmitted from the transmitter 16 of the spare tire 6 shows no increase in the temperature data and in the pressure data contained therein. The receiver 30 will receive the signals transmitted from the transmitter 16 of the spare tire 6 repetitively after the automotive vehicle starts traveling. Hence, the control unit deletes the "provisional ID" corresponding to the transmitter 16 of the spare tire 6 stored in RAM 33c by successively executing the processing of steps S190, S240, S250, and S260, when this transmitter ID has been received the predetermined times.

When the temperature/pressure increasing pattern disagrees with the traveling pattern (NO in step S200), the control unit 33 proceeds to the step S260 to delete the "provisional ID" corresponding to the "received ID" from RAM 33c.

For example, the control unit 33 will sequentially execute the processing of steps S190, S200, and S260 in the following cases.

The subjective vehicle 1 may accidentally receive a signal transmitted from a foreign transmitter attached to a tire of a neighboring vehicle which is for example stopped at the next lane for a red signal lamp. In this case, the ID of this foreign transmitter may be erroneously registered in the subjective vehicle 1. Subsequently, after the signal lamp turns green, the neighboring vehicle will possibly travel with the subjective vehicle 1 at the same speed for a while. Then, they will separate from each other due to change of traveling speed and/or course.

In such a case, the control unit 33 can delete the erroneously registered transmitter ID of other vehicle from RAM 33c by sequentially executing the processing of the steps S190, S200, and S260.

Furthermore, when the number of the "provisional IDs" stored in RAM 33c is not 4 (i.e., NO in step S220), the control unit 33 checks whether or not a predetermined time of approximately 30 minutes has elapsed since the automotive vehicle started traveling (step S270). When the elapsed time is less than 30 minutes (i.e., NO in step S270), the control unit 33 accomplishes this processing.

On the other hand, when the elapsed time exceeds 30 minutes (i.e., YES in step S270), the control unit 33 selects a total of four "provisional IDs" in order of count value in the counter (step S280). The four "provisional IDs" selected in the step S280 are registered as authorized IDs in EEPROM 33d (step S230).

In this manner, by sequentially executing the processing of the steps S220, S270, S280, and S220, it becomes possible to prevent the "provisional IDs" corresponding to the transmitters of other vehicles, such as neighboring vehicles stopped nearby at an intersection, from being erroneously registered as authorized IDs.

Executing the above-described pneumatic tire pressure monitoring processing makes it possible to automatically register the IDs of the transmitters 12 to 15 of the tires 2 to 5 actually installed on the vehicle wheels as authorized IDs into EEPROM 33d while the automotive vehicle 1 travels a significant distance.

Furthermore, in the case that one of tires 2 to 5 is replaced by the spare tire 6 due to puncture or relocation of tire positions, the transmitter signal sent from this detached tire shows no increase in temperature and pressure because no flexing occurs in this tire. The ID of the transmitter attached to the detached tire is then automatically and immediately deleted from EEPROM 33d when the control unit 33 executes the processing of the step S240. Thus, it becomes possible to effectively prevent the warning from being continuously generated even after the punctured tire is replaced by the spare tire 6.

The spare tire 6 does not rotate when the automotive vehicle is traveling. The signal sent from the transmitter 16 of the spare tire 6 shows no increase in temperature and pressure. Hence, the control unit 33 deletes the "authorized ID" corresponding to the transmitter 16 of spare tire 6 from EEPROM 33d and also deletes the "provisional ID" corresponding to the transmitter 16 of spare tire 6 from RAM 33c, by sequentially executing the processing of the steps S190, S240, S250, and S260. As a result, only the IDs of the transmitters 12 to 15 of four tires 2 to 5 actually installed on the vehicle wheels become objectives of warning to be generated through the pneumatic pressure monitoring processing executed in the steps S20 to S40. The spare tire 6 can be surely excluded from the objectives of warning.

Next, the second embodiment of the present invention will be explained. The structural arrangement of the second embodiment is identical with that of the first embodiment. The transmitters 12 to 16 execute the same processing. The second embodiment differs from the first embodiment in the pneumatic tire pressure monitoring processing executed by the control unit 33 of the receiver 30.

Figure 8:
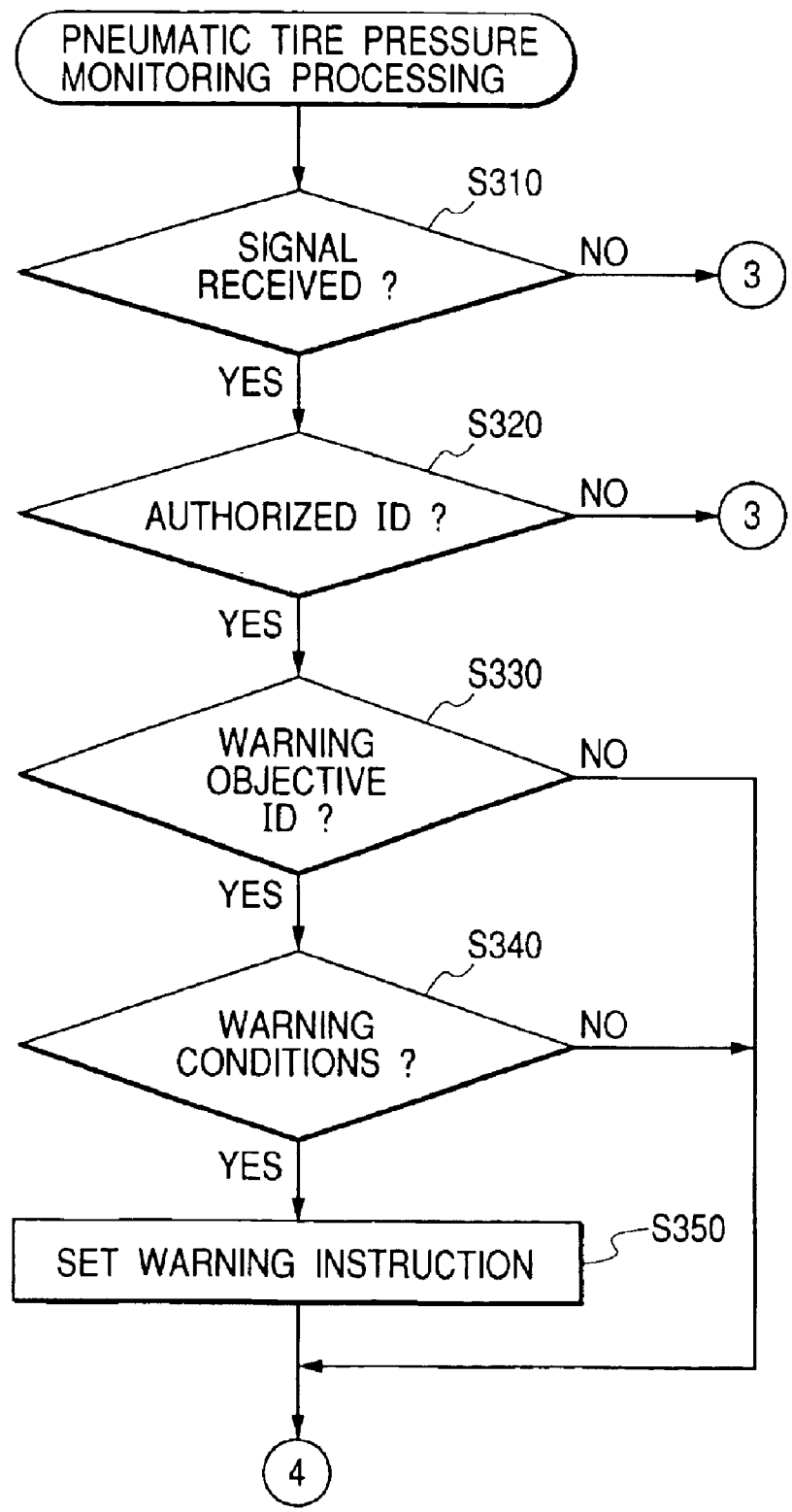
FIGS. 8 and 9 cooperatively show the pneumatic tire pressure monitoring processing in accordance with a second embodiment of the present invention.
Figure 9:
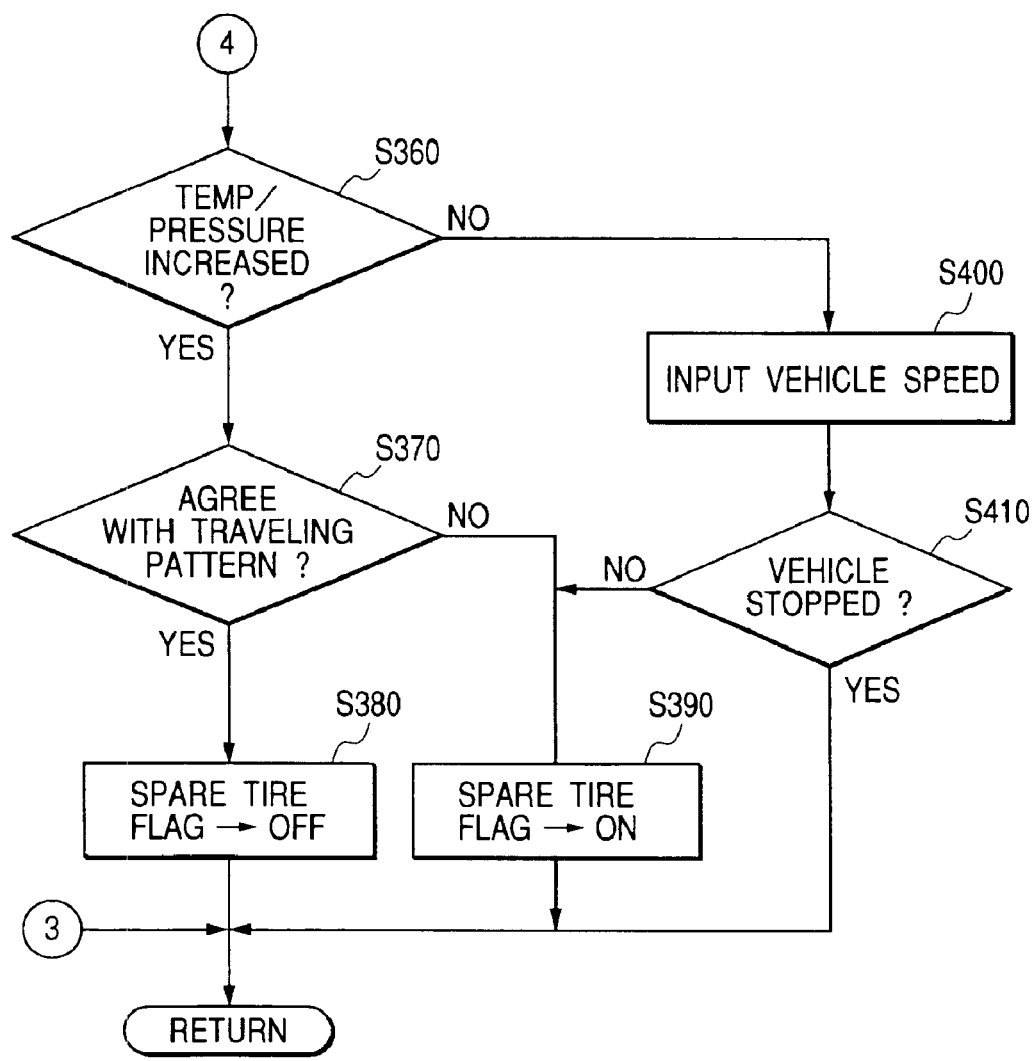

FIGS. 8 and 9 cooperatively show the pneumatic tire pressure monitoring processing executed by the control unit 33 of the receiver 30 in accordance with the second embodiment of the present invention. The software for executing the pneumatic tire pressure monitoring processing shown in FIGS. 8 and 9 is installed or stored in ROM 33b. EEPROM 33d registers beforehand the IDs of five transmitters 12 to 16.

The second embodiment prepares a spare tire flag, as attribute information of each ID, for identifying the ID corresponding to the spare tire 6 among the five IDs registered in EEPROM 33d. More specifically, a spare tire flag being turned into ON is attached to the ID of the transmitter 16 of the spare tire 6. On the other hand, a spare tire flag being turned into OFF is attached to each of the IDs of the remaining transmitters 12 to 15. In this respect, the IDs accompanied with the spare tire flag being turned into OFF are referred to as "warning objective ID" hereinafter.

As shown in FIG. 8, according to the pneumatic tire pressure monitoring processing in accordance with the second embodiment, the control unit 33 first makes a judgment as to whether or not a radio signal from the transmitter is received (step S310). When the radio signal is received from the transmitter (i.e., YES in step S310), the control unit 33 checks whether or not the ID contained in the received signal agrees with any one of five authorized IDs stored in EEPROM 33d (step S320). When the received ID agrees with one of the authorized IDs (YES in step S320), the control unit 33 checks whether or not the received ID agrees with any one of the warning objective IDs (step S330). When the received ID agrees with any one of the warning objective IDs (i.e., YES in step S330), the control unit 33 checks whether or not the pressure data contained in the received signal fulfill the warning conditions (step S340). As described in the first embodiment, the warning conditions include a judgment as to whether or not the pressure data is in an abnormally low pressure level equivalent to that of a punctured tire. When the pressure data contained in the received signal fulfill the warning conditions (i.e., YES in step S340), the control unit 33 sets a warning instruction to the interface circuit 34 (step S350) and proceeds to the next step S360. The display unit 50 executes a warning display based on the warning instruction being set in the step S350, thereby informing a user of the presence of a punctured tire belonging to its own vehicle.

On the other hand, when no signal is received (i.e., NO in step S310) and also when the received ID disagrees with the authorized IDs (NO in step S320), the control unit 33 immediately accomplishes this processing. When the received ID disagrees with any one of the warning objective IDs (i.e., NO in step S330), the control unit 33 skips the processing of steps S340 and S350 and proceeds to the step S360. Furthermore, when the pressure data contained in the received signal do not fulfill the warning conditions (i.e., NO in step S340), the control unit 33 skips the processing of step S350 and proceeds to the step S360.

In the step S360, the control unit 33 checks whether or not the signal received in the step S310 shows increase in both the temperature data and the pressure data. When the received signal shows increase in both the temperature data and the pressure data (i.e., YES in step S360), the control unit 33 checks whether or not the increasing pattern of temperature and pressure agrees with the traveling pattern (step S370) in the same manner as is done in the judgment processing executed in the step S200 of the first embodiment.

When the temperature/pressure increasing pattern agrees with the traveling pattern (i.e., YES in step S370), the spare tire flag attached to the "authorized ID" agreeing with the "received ID" is turned into OFF (step S380).

On the other hand, when the temperature/pressure increasing pattern disagrees with the traveling pattern (i.e., NO in step S370), the spare tire flag attached to the "authorized ID" agreeing with the "received ID" is turned into ON (step S390).

Meanwhile, when the signal received in the step S310 shows no increase in both the temperature data and the pressure data (i.e., NO in step S360), the control unit 33 inputs the speed signal from the vehicle speed sensor 60 (step S400). Then, the control unit 33 makes a judgment based on the detected vehicle speed as to whether or not the automotive vehicle 1 is stopped (step S410). When the automotive vehicle 1 is stopped (i.e., YES in step S410), the control unit 33 accomplishes this processing.

On the other hand, when the automotive vehicle 1 is traveling (i.e., NO in step S410), the control unit 33 proceeds to the step S390 to turn the spare tire flag attached to the "authorized ID" agreeing with the "received ID" into ON.

As a result of executing the above-described control processing, the second embodiment of the present invention makes it possible to automatically identify the spare tire 6 which is not actually installed on the vehicle wheels among a total of five tires 2 to 6 prepared and belonging to this vehicle. Thus, the second embodiment can surely prevent the warning processing from being executed unnecessarily for the spare tire 6.

In general, the four tires 2 to 5 attached to the vehicle wheels may be punctured accidentally and, in such a case, a user will exchange the punctured tire with the spare tire 6. When any one of the four tires 2 to 5 is exchanged with the spare tire 6 due to puncture, the signal sent from the transmitter of the punctured tire shows no increase in the temperature and pressure even if the vehicle is traveling. Accordingly, the control unit 33 sequentially executes the processing of the steps S360, S400, S410, and S390. Thus, the spare tire flag (i.e., attribute information) of the "authorized ID" agreeing with the ID of this punctured tire is turned into ON. Thus, the punctured tire is surely excluded from the objectives of the warning.

Meanwhile, the spare tire 6 is replaced with the punctured tire and is installed on the vehicle wheel. The signal sent from the transmitter 16 of the spare tire 6 shows increase in the temperature and pressure. Accordingly, the control unit 33 sequentially executes the processing of the steps S360, S370, and S380. Thus, the spare tire flag of the "authorized ID" of the transmitter 16 of the spare tire 6 is turned into OFF. Thus, the spare tire 6 is surely added to the objectives of the warning.

In this manner, among a total of five tires 2 to 6 belonging to the automotive vehicle 1, four tires actually installed on the vehicle wheels are precisely identified. The warning operation can be executed only for the true objectives except for the tire detached from the vehicle wheels. Thus, it becomes possible to prevent the warning from being erroneously generated based on the signal received from the transmitter of a punctured or detached tire.

The present invention is not limited to the above-described embodiments and, accordingly, can be modified in various ways without departing from the gist of the invention.

For example, although the above-described first and second embodiments discriminate the spare tire from the rotating or driven tires actually installed on the vehicle wheels with reference to the increasing patterns of temperature and pressure, it is possible to use either one the increasing pattern of temperature and the increasing pattern of pressure because the temperature and pressure are similar in their increasing patterns.

Furthermore, it is preferable that each of the transmitters 12 to 16 outputs a radio signal carrying a detection value of the voltage sensor 23. The detection value of the voltage sensor 23 is usable in a judgment as to whether or not the received signal originates from the transmitter of a rotating tire. In this case, it is preferable that the signal generated from respective transmitters 12 to 16 contains information indicating voltage detection intervals of the voltage sensor 23. In this case, the traveling speed can be estimated based on the voltage detection intervals. The estimated traveling speed is compared with the speed detected by the vehicle speed sensor 60 to judge as to whether the received signal has arrived from its own vehicle or from other vehicle.

It is also preferable that each of the transmitters 12 to 16 is equipped with a G sensor and a detection value of this G sensor is included in the signal transmitted from respective transmitters 12 to 16. The detection value of the G sensor can be used to judge whether or not the received signal originates from the transmitter of a tire of its own vehicle. In this case, a conversion formula is applied to the detection value of the G sensor depending on the detection direction of the G sensor. The traveling pattern is detectable based on the relationship between an angular acceleration (dω/dt) and the traveling speed or the acceleration of the vehicle. Having the capability of identifying the traveling pattern makes it possible to exclude the signals sent from transmitters of other vehicles.

Although each of the above-described embodiments judges the traveling condition of the vehicle based on the detection signal of the vehicle speed sensor 60, it is possible to judge the traveling condition of the vehicle based on the detection value of the voltage sensor 23 in respective transmitters 12 to 16.

According to the above-described embodiments, the time intervals for transmitting signals from respective transmitters are elongated when the automotive vehicle is stopped for the purpose of saving electric power consumption in the transmitters. This differentiation is usable for discriminating the transmitter signal of the spare tire from other transmitter signals. It is also possible to use the relationship between the information obtainable from respective wheel speed sensors and the acceleration.

What is claimed is:

1. A method for registering identifications (IDs) of transmitters associated with respective tires of its own vehicle to a memory of a pneumatic tire pressure monitoring apparatus provided in a vehicle body, comprising the steps of:

causing each transmitter to transmit variable data of an associated tire together with an ID assigned to said each transmitter, said variable data varying between a moment said vehicle is traveling and a moment said vehicle is stopped;

causing said pneumatic tire pressure monitoring apparatus to receive said variable data;

inputting traveling condition specifying data which specifies traveling conditions of said vehicle;

registering said ID transmitted from each of said transmitters as a provisional ID of said transmitter when said traveling condition specifying data indicates that said vehicle is stopped;

judging whether said provisional ID of each of said transmitters agrees with said ID transmitted from said transmitter when said traveling condition specifying data indicates that said vehicle is traveling;

identifying said provisional ID of one of the transmitters associated with the tires actually installed on wheels of the vehicle based on said variable data transmitted from said transmitter when said provisional ID agrees with said ID transmitted from said transmitter;

registering said identified provisional ID of said transmitter into said memory of the pneumatic tire pressure monitoring apparatus as an authorized ID of said transmitter.

2. The transmitter ID registering method in accordance with claim 1, wherein said variable data of the associated tire include at least one of temperature and pressure of said associated tire.

3. The transmitter ID registering method in accordance with claim 1, wherein said traveling condition specifying data include at least one of traveling speed and acceleration of said vehicle.

4. The transmitter ID registering method in accordance with claim 1, wherein said step of identifying said provisional ID of each of said transmitters is executed after a predetermined time has elapsed since said vehicle started traveling.

5. A method for identifying transmitters associated with respective tires actually installed on vehicle wheels of its own vehicle among a plurality of transmitters prepared for tires of said vehicle, comprising the steps of:

causing each transmitter to transmit variable data of an associated tire together with an identification (ID) assigned to said each transmitter, said variable data varying between a moment said vehicle is traveling and a moment said vehicle is stopped;

causing a receiver provided in a vehicle body to receive said variable data and said ID;

inputting traveling condition specifying data which specifies traveling conditions of said vehicle;

registering said ID transmitted from each of said transmitters as a provisional ID of said transmitter when said traveling condition specifying data indicates that said vehicle is stopped;

judging whether said provisional ID of each of said transmitters agrees with said ID transmitted from said transmitter when said traveling condition specifying data indicates that said vehicle is traveling; and identifying one of the transmitters of the tires actually installed on the vehicle wheels based on said variable data transmitted from said transmitter when said provisional ID of said transmitter agrees with said ID transmitted from said transmitter.

6. The transmitter identifying method in accordance with claim 5, wherein said variable data of the associated tire include at least one of temperature and pressure of said associated tire.

7. The transmitter identifying method in accordance with claim 5, wherein said traveling condition specifying data include at least one of traveling speed and acceleration of said vehicle.

8. A system for registering identifications (IDs) of transmitters associated with respective tires of a vehicle to a memory of a pneumatic tire pressure monitoring apparatus provided in a vehicle body, comprising:

signal transmitting means, provided in said each transmitter, for transmitting a signal carrying variable data of the associated tire together with an ID assigned to said each transmitter, said variable data varying between a moment said vehicle is traveling and a moment said vehicle is stopped;

signal receiving means for receiving said signal carrying said variable data and said ID transmitted from said signal transmitting means of each of said transmitters;

traveling condition specifying data inputting means for inputting traveling condition specifying data which specifies traveling conditions of said vehicle;

provisional ID registering means for registering said ID of said each transmitter contained in the signal received by said signal receiving means as a provisional ID of said transmitter when said traveling condition specifying data received by said traveling condition specifying data inputting means indicates that said vehicle is stopped;

judging means for judging whether said provisional ID of each of said transmitters registered by said provisional ID registering means agrees with said ID of said transmitter received by said signal receiving means when said traveling condition specifying data received by said traveling condition specifying data inputting means indicates that said vehicle is traveling;

ID identifying means for identifying said provisional ID of one of the transmitters of the tires actually installed on wheels of the vehicle based on said variable data of the signal received from said transmitter by said signal receiving means when said judging means judges that said provisional ID agrees with said ID of said transmitter received by said signal receiving means; and ID registering means for registering said provisional ID of said transmitter identified by said ID identifying means into said memory of the pneumatic tire pressure monitoring apparatus as an authorized ID of said transmitter.

9. The transmitter ID registering system in accordance with claim 8, wherein said variable data of the associated tire include at least one of temperature and pressure of said associated tire.

10. The transmitter ID registering system in accordance with claim 8, wherein said traveling condition specifying data include at least one of traveling speed and acceleration of said vehicle.

11. The transmitter ID registering system in accordance with claim 8, wherein said ID identifying means executes the processing of identifying IDs assigned to the transmitters of the tires actually installed on the vehicle wheels after a predetermined time has elapsed since said vehicle started traveling.

12. A system for identifying transmitters associated with respective tires actually installed on vehicle wheels of its own vehicle among a plurality of transmitters prepared for tires of said vehicle, comprising:

signal transmitting means, provided in each transmitter, for transmitting a signal carrying variable data of an associated tire together with an identification (ID) assigned to said each transmitter, said variable data varying between a moment said vehicle is traveling and a moment said vehicle is stopped;

signal receiving means for receiving a signal of said variable data and said ID transmitted from signal transmitting means of each of said transmitters;

traveling condition specifying data inputting means for inputting traveling condition specifying data which specifies traveling conditions of said vehicle;

provisional ID registering means for registering said ID of said each transmitter contained in the signal received by said signal receiving means as a provisional ID of said transmitter when said traveling condition specifying data received by said traveling condition specifying data inputting means indicates that said vehicle is stopped;

judging means for judging whether said provisional ID of each of said transmitters registered by said provisional ID registering means agrees with said ID of said transmitter received by said receiving means when said traveling condition specifying data received by said traveling condition specifying data inputting means indicates that said vehicle is traveling;

transmitter identifying means for identifying one of the transmitters associated with the tires actually installed on the vehicle wheels based on said variable data of the signal received from said transmitter by said signal receiving means when said judging means judges that said provisional ID of said transmitter agrees with said ID of said transmitter.

13. The transmitter identifying system in accordance with claim 12, wherein said variable data of the associated tire include at least one of temperature and pressure of said associated tire.

14. The transmitter identifying system in accordance with claim 12, wherein said traveling condition specifying data include at least one of traveling speed and acceleration of said vehicle.

15. A pneumatic tire pressure monitoring system comprising:

a plurality of transmitters each detecting an air pressure of an associated tire and transmitting the detected air pressure together with an identification (ID) assigned to each transmitter;

a memory for registering IDs assigned to transmitters of respective tires actually installed on vehicle wheels of its own vehicle;

a receiver for receiving a signal transmitted from said each transmitter, judging whether the received signal originates from any one of the transmitters associated with the tires actually installed on the vehicle wheels by comparing the ID contained in the received signal with said IDs registered in said memory, judging whether there is any abnormality occurring in the air pressure when said received signal originates from any one of the transmitters associated with the tires actually installed on the vehicle wheels, and generating a warning when any abnormality occurs in the air pressure of the tires actually installed on the vehicle wheels;

signal transmitting means, provided said each transmitter, for transmitting a signal carrying variable data of the associated tire together with the ID assigned to said each transmitter, said variable data varying between a moment said vehicle is traveling and a moment said vehicle is stopped;

signal receiving means for receiving said signal carrying said variable data and said ID transmitted from said variable data transmitting means of said each transmitter;

traveling condition specifying data inputting means for inputting traveling condition specifying data which specifies traveling conditions of said vehicle;

provisional ID registering means for registering said ID of each of said transmitters contained in the signal received by said signal receiving means as a provisional ID of said transmitter when said traveling condition specifying data received by said traveling condition specifying data inputting means indicates that said vehicle is stopped;

judging means for judging whether said provisional ID of each of said transmitters registered by said provisional ID registering means agrees with said ID of said transmitter received by said signal receiving means when said traveling condition specifying data received by said traveling condition specifying data inputting means indicates that said vehicle is traveling;

ID identifying means for identifying said provisional ID of one of the transmitters of the tires actually installed on wheels of the vehicle based on said variable data of the signal received by said signal receiving means when said judging means judges that said provisional ID agrees with said ID of said transmitter received by said signal receiving means; and ID registering means for registering said provisional ID of said transmitter identified by said ID identifying means into said memory as an authorized ID of said transmitter.

16. The pneumatic tire pressure monitoring system in accordance with claim 15, wherein said variable data of the associated tire include at least one of temperature and pressure of said associated tire.

17. The pneumatic tire pressure monitoring system in accordance with claim 15, wherein said traveling condition specifying data include at least one of traveling speed and acceleration of said vehicle.

18. A pneumatic tire pressure monitoring system comprising:

a plurality of transmitters each detecting an air pressure of an associated tire and transmitting the detected air pressure together with an identification (ID) assigned to each transmitter;

a memory for registering IDs assigned to transmitters of respective tires actually installed on vehicle wheels of its own vehicle;

a receiver for receiving a signal transmitted from said each transmitter, judging whether the received signal originates from any one of the transmitters associated with the tires actually installed on the vehicle wheels by comparing the ID contained in the received signal with said IDs registered in said memory, judging whether there is any abnormality occurring in the air pressure when said received signal originates from any one of the transmitters associated with the tires actually installed on the vehicle wheels, and generating a warning when any abnormality occurs in the air pressure of the tires actually installed on the vehicle wheels;

variable data transmitting means, providing in said each transmitter, for transmitting variable data of the associated tire together with the ID assigned to said each transmitter, said variable data varying between a moment said vehicle is traveling and a moment said vehicle is stopped;

variable data receiving means for receiving a signal carrying said variable data transmitted from said variable data transmitting means;

traveling condition specifying data inputting means for inputting traveling condition specifying data which specifies traveling conditions of said vehicle;

ID identifying means for identifying IDs assigned to the transmitters of the tires actually installed on the vehicle wheels based on the signal received by said variable data receiving means and the traveling condition specifying data entered by said traveling condition specifying data inputting means, wherein said ID identifying means identifies said IDs as being assigned to the transmitters of the tires actually installed on the vehicle wheels when the variable data received by said variable data receiving means are obtainable in a traveling condition corresponding to said traveling condition specifying data entered by said traveling condition specifying data inputting means;

ID registering means for registering said IDs identified by said ID identifying means into said memory;

provisional ID registering means for registering the ID contained in the signal received by said variable data receiving means as a provisional ID when said vehicle is stopped;

provisional ID deleting means for deleting said provisional ID in a case that said provisional ID disagrees with the IDs assigned to the transmitters of the tires actually installed on the vehicle wheels, according to judgment of said ID identifying means which is activated when the ID contained in the signal received by said variable data receiving means agrees with said provisional ID registered in said provisional ID registering means in a traveling condition of the vehicle; and provisional ID number judging means for judging whether predetermined number of provisional IDs are present, wherein said ID registering means registers said predetermined number of provisional IDs as authorized IDs into said memory, when the presence of said predetermined number of provisional IDs is recognized by said provisional ID number judging means.

19. The pneumatic tire pressure monitoring system in accordance with claim 18, further comprising additional provisional ID deleting means for:

judging whether the variable data received by said variable data receiving means agree with data obtainable in a traveling condition of the vehicle when the ID received by said variable data receiving means agrees with said provisional ID registered by said provisional ID registering means in the traveling condition of the vehicle;

counting the frequency in receiving said provisional ID during the traveling condition of the vehicle, when judged as the variable data received by said variable data receiving means disagree with the data obtainable in the traveling condition of the vehicle; and deleting said provisional ID when a counting value reaches a predetermined number.

20. The pneumatic tire pressure monitoring system in accordance with claim 18, further comprising:

provisional ID weighting means for activating said ID identifying means when the ID contained in the signal received by said variable data receiving means agrees with said provisional ID registered by said provisional ID registering means in the traveling condition of the vehicle, and increasing a priority order of the provisional ID for authorized registration when said ID specifying means can identify said provisional ID as being assigned to one of the transmitters of the tires actually installed on the vehicle wheels; and elapsed time judging means for judging whether or not a predetermined time has elapsed since said vehicle started traveling, when the presence of said predetermined number of provisional IDs is recognized by said provisional ID number judging means, wherein said ID registering means registers a plurality of provisional IDs as authorized IDs into said memory considering said priority order as much as a total number of the tires actually installed on the vehicle wheels, when elapse of said predetermined time is recognized by said elapsed time judging means.

21. A pneumatic tire pressure monitoring system comprising:

a plurality of transmitters each detecting an air pressure of an associated tire and transmitting the detected air pressure together with an identification (ID) assigned to each transmitter;

a memory for registering IDs assigned to transmitters of respective tires actually installed on vehicle wheels of its own vehicle;

a receiver for receiving a signal transmitted from said each transmitter, judging whether the received signal originates from any one of the transmitters associated with the tires actually installed on the vehicle wheels by comparing the ID contained in the received signal with said IDs registered in said memory, judging whether there is any abnormality occurring in the air pressure when said received signal originates from any one of the transmitters associated with the tires actually installed on the vehicle wheels, and generating a warning when any abnormality occurs in the air pressure of the tires actually installed on the vehicle wheels;

signal transmitting means, provided in said each transmitter, for transmitting a signal carrying variable data of the associated tire together with the ID assigned to said each transmitter, said variable data varying between a moment said vehicle is traveling and a moment said vehicle is stopped;

signal receiving means for receiving said signal of said variable data and said ID transmitted from said signal transmitting means of each of said transmitters;

traveling condition specifying data inputting means for inputting traveling condition specifying data which specifies traveling conditions of said vehicle;

provisional ID registering means for registering said ID of each of said transmitters contained in the signal received by said signal receiving means as a provisional ID of said transmitter when said traveling condition specifying data received by said traveling condition specifying data inputting means indicates that said vehicle is stopped;

judging means for judging whether said provisional ID of each of said transmitters registered by said provisional ID registering means agrees with said ID of said transmitter received by said receiving means when said traveling condition specifying data received by said traveling condition specifying data inputting means indicates that said vehicle is traveling;

transmitter identifying means for identifying one of the transmitters of the tires actually installed on the vehicle wheels based on said variable data of the signal received from said transmitter by said signal receiving means when said judging means judges that said provisional ID of said transmitter agrees with said ID of said transmitter.

22. The pneumatic tire pressure monitoring system in accordance with claim 21, further comprising excluding means for excluding said ID contained in the signal received from said signal receiving means from objectives of warning performed by said receiver when the variable data received by said signal receiving means disagree with data obtainable in a traveling condition of the vehicle corresponding to the traveling condition specifying data entered by said traveling condition specifying data input means.

23. The pneumatic tire pressure monitoring system in accordance with claim 21, further comprising setting means for setting said ID contained in the signal received from said signal receiving means as an objective of warning performed by said receiver when the variable data received by said signal receiving means agree with data obtainable in a traveling condition of the vehicle corresponding to the traveling condition specifying data entered by said traveling condition specifying data input means.

24. The pneumatic tire pressure monitoring system in accordance with claim 21, wherein said variable data of the associated tire include at least one of temperature and pressure of said associated tire.

25. The pneumatic tire pressure monitoring system in accordance with claim 21, wherein said traveling condition specifying data include at least one of traveling speed and acceleration of said vehicle.

26. A pneumatic tire pressure monitoring apparatus comprising:

receiving means for receiving air-pressure data and an identification (ID) transmitted from transmitters associated with respective tires of its own vehicle;

a memory for registering identifications (IDs) assigned to transmitters of respective tires belonging to said vehicle;

control means for identifying air-pressure data of the tires belonging to said vehicle by comparing the ID received by said receiving means with the IDs registered in said memory, judging whether there is any abnormality occurring in the air pressure of the respective tires belonging to said vehicle based on said identified air-pressure data, and generating a warning when any abnormality occurs in the air pressure of the tires belonging to said vehicle;

signal receiving means for receiving a signal carrying variable data and the IDs transmitted from said transmitters, said variable data varying between a moment said vehicle is traveling and a moment said vehicle is stopped;

traveling condition specifying data inputting means for inputting traveling condition specifying data which specifies traveling conditions of said vehicle;

provisional ID registering means for registering said ID of each of said transmitters received by said signal receiving means as a provisional ID of said transmitter when said traveling condition specifying data received by said traveling condition specifying data inputting means indicates that said vehicle is stopped;

judging means for judging whether said provisional ID of each of said transmitters registered by said provisional ID registering means agrees with said ID of said transmitter received by said signal receiving means when said traveling condition specifying data received by said traveling condition specifying data inputting means indicates that said vehicle is traveling;

ID identifying means for identifying said provisional ID assigned to one of the transmitters of the tires actually installed on wheels of the vehicle based on said variable data of the signal received from said transmitter by said signal receiving means when said judging means judges that said provisional ID agrees with said ID of said transmitter received by said signal receiving means; and ID registering means for registering said provisional ID of said transmitter identified by said ID identifying means into said memory as an authorized ID of said transmitter.

27. The pneumatic tire pressure monitoring system in accordance with claim 26, wherein said variable data include at least one of temperature and pressure of said associated tire.

28. The pneumatic tire pressure monitoring system in accordance with claim 26, wherein said traveling condition specifying data include at least one of traveling speed and acceleration of said vehicle.

29. A pneumatic tire pressure monitoring apparatus, comprising:

receiving means for receiving air-pressure data and an identification (ID) transmitted from transmitters associated with respective tires of its own vehicle;

a memory for registering identifications (IDs) associated to transmitters of respective tires belonging to said vehicle;

control means for identifying air-pressure data of the tires belonging to said vehicle by comparing the ID received by said receiving means with the IDs registered in said memory, judging whether there is any abnormality occurring in the air pressure of the respective tires belonging to said vehicle based on said identified air-pressure data, and generating a warning when any abnormality occurs in the air pressure of the tires belonging to said vehicle;

variable data receiving means for receiving a signal carrying variable data and ID transmitted from said transmitters, said variable data varying between a moment said vehicle is traveling and a moment said vehicle is stopped;

traveling condition specifying data inputting means for inputting traveling condition specifying data which specifies traveling conditions of said vehicle;

ID identifying means for identifying IDs assigned to the transmitters of the tires actually installed on vehicle wheels based on the signal received by said variable data receiving means and the traveling condition specifying data entered by said traveling condition specifying data inputting means, wherein said ID identifying means identifies the ID contained in the signal received by said variable data receiving means as one of the IDs assigned to the transmitters of the tires actually installed on the vehicle wheels, when the variable data received by said variable data receiving means agree with data obtainable in a traveling condition of the vehicle corresponding to the traveling condition specifying data entered by said traveling condition specifying data input means;

ID registering means for registering said IDs identified by said ID identifying means into said memory;

provisional ID registering means for registering the ID contained in the signal received by said variable data receiving means as a provisional ID when said vehicle is stopped;

provisional ID deleting means for deleting said provisional ID in a case that said provisional ID disagrees with the IDs assigned to the transmitters of the tires actually installed on the vehicle wheels, according to judgment of said ID identifying means which is activated when the ID contained in the signal received by said variable data receiving means agrees with said provisional ID registered in said provisional ID registering means in a traveling condition of the vehicle; and provisional ID number judging means for judging whether a predetermined number of provisional IDs are present, wherein said ID registering means registers said predetermined number of provisional IDs as authorized IDs into said memory, when the presence of said predetermined number of provisional IDs is recognized by said provisional ID number judging means.

30. The pneumatic tire pressure monitoring system in accordance with claim 29, further comprising additional provisional ID deleting means for:

judging whether the variable data received by said variable data receiving means agree with data obtainable in a traveling condition of the vehicle when the ID contained in the signal received by said variable data receiving means agrees with said provisional ID registered by said provisional ID registering means in the traveling condition of the vehicle;

counting the frequency in receiving said provisional ID during the traveling condition of the vehicle, when judged as the variable data received by said variable data receiving means disagree with the data obtainable in the traveling condition of the vehicle; and deleting said provisional ID when a counting value reaches a predetermined number.

31. The pneumatic tire pressure monitoring system in accordance with claim 29, further comprising:

provisional ID weighting means for activating said ID identifying means when the ID contained in the signal received by said variable data receiving means agrees with said provisional ID registered by said provisional ID registering means in the traveling condition of the vehicle, and increasing a priority order of the provisional ID for authorized registration when said ID specifying means identified said provisional ID as being assigned to one of the transmitters of the tires actually installed on the vehicle wheels; and elapsed time judging means for judging whether a predetermined time has elapsed since said vehicle started traveling, when the presence of said predetermined number of provisional IDs is recognized by said provisional ID number judging means, wherein said ID registering means registers a plurality of provisional IDs as authorized IDs into said memory considering said priority order as much as a total number of the tires actually installed on the vehicle wheels, when elapse of said predetermined time is recognized by said elapsed time judging means.

32. A pneumatic tire pressure monitoring apparatus comprising:

receiving means for receiving air-pressure data and identification (ID) transmitted from transmitters associated with respective tires of its own vehicle;

a memory for registering IDs assigned to transmitters of respective tires belonging to said vehicle;

control means for identifying air-pressure data of the tires belonging to said vehicle by comparing the ID received by said receiving means with the IDs registered in said memory, judging whether there is any abnormality occurring in the air pressure of the respective tires belonging to said vehicle based on said identified air-pressure data, and generating a warning when any abnormality occurs in the air pressure of the tires belonging to said vehicle;

signal receiving means for receiving a signal carrying variable data and the IDs transmitted from said transmitters, said variable data varying between a moment said vehicle is traveling and a moment said vehicle is stopped;

traveling condition specifying data inputting means for inputting traveling condition specifying data which specifies traveling conditions of said vehicle;

provisional ID registering means for registering said ID of said each transmitter contained in the signal received by said signal receiving means as a provisional ID of said transmitter when said traveling condition specifying data received by said traveling condition specifying data inputting means indicates that said vehicle is stopped;

judging means for judging whether said provisional ID of each of said transmitters registered by said provisional ID registering means agrees with said ID of said transmitter received by said receiving means when said traveling condition specifying data received by said traveling condition specifying data inputting means indicates that said vehicle is traveling;

transmitter identifying means for identifying one of the transmitters of the tires actually installed on the vehicle wheels based on said variable data of the signal received from said transmitter by said signal receiving means when said judging means judges that said provisional ID of said transmitter agrees with said ID of said transmitter.

33. The pneumatic tire pressure monitoring system in accordance with claim 32, further comprising excluding means for excluding said ID contained in the signal received from said signal receiving means from objectives of warning performed by said control means when the variable data received by said signal receiving means disagree with data obtainable in a traveling condition of the vehicle corresponding to the traveling condition specifying data entered by said traveling condition specifying data input means.

34. The pneumatic tire pressure monitoring system in accordance with claim 32, further comprising setting means for setting said ID contained in the signal received from said signal receiving means as an objective of warning performed by said control means when the variable data received by said signal receiving means agree with data obtainable in a traveling condition of the vehicle corresponding to the traveling condition specifying data entered by said traveling condition specifying data input means.

35. The pneumatic tire pressure monitoring system in accordance with claim 32, wherein said variable data include at least one of temperature and pressure of said associated tire.

36. The pneumatic tire pressure monitoring system in accordance with claim 32, wherein said traveling condition specifying data include at least one of traveling speed and acceleration of said vehicle.

37. A program executed in a computer constituting a control unit of a pneumatic tire pressure monitoring apparatus for monitoring the air pressure of tires belonging to its own vehicle based on signals transmitted from transmitters associated with said tires, comprising:

a receiving step of receiving a signal from each transmitter;

an identification (ID) checking step of judging whether an ID contained in the signal received from said each transmitter agrees with an already registered ID, when the signal from said each transmitter is received in said receiving step;

an air-pressure judging step of judging whether there is any abnormality in an air pressure of a tire equipped with said each transmitter based on air-pressure data contained in the signal received from said each transmitter, when agreement between the ID contained in the signal received from said each transmitter and said already registered ID is recognized in said ID checking step;

a warning step of executing a predetermined warning operation, when any abnormality in the air pressure of the tire equipped with said each transmitter is found in said air-pressure judging step;

a stopping condition judging step of judging whether the vehicle is stopped, when disagreement between the ID contained in the received signal and said already registered ID is recognized in said ID checking step;

a provisional ID registering step of registering the ID being judged as disagreeing with said already registered ID in said ID checking step as a provisional ID, when stoppage of said vehicle is recognized in said stopping condition judging step;

a provisional ID judging step of judging whether the ID contained in the received signal agrees with said provisional ID, when traveling of said vehicle is recognized in said stopping condition judging step;

an increasing pattern judging step of judging whether at least one of pressure and temperature data contained in said received signal is in an increasing pattern, when agreement between the ID contained in the received signal and said provisional ID is recognized in said provisional ID judging step;

a traveling pattern agreement judging step of judging whether said at least one of pressure and temperature data contained in said received signal agrees with an increasing pattern of at least one of temperature and pressure in a present traveling pattern of the vehicle, when the increasing pattern is recognized in said increasing pattern judging step;

a provisional ID number judging step of judging whether the number of provisional IDs agrees with a total number of said tires of the vehicle, when agreement between said at least one of pressure and temperature data contained in said received signal and the increasing pattern of at least one of temperature and pressure in the present traveling pattern of the vehicle is recognized in said traveling pattern agreement judging step; and an authorized ID registering step of registering said provisional IDs as authorized IDs, when agreement between the number of said provisional IDs and the total number of said tires of the vehicle is recognized in said provisional ID number judging step.

38. The pneumatic tire pressure monitoring program in accordance with claim 37, further comprising:

weighting step of increasing a priority order of the provisional ID for authorized registration, when agreement between said at least one of pressure and temperature data contained in said received signal and the increasing pattern of at least one of temperature and pressure in the present traveling pattern of the vehicle is recognized in said traveling pattern agreement judging step; and elapsed time judging step of judging whether or not a predetermined time has elapsed since the vehicle started traveling, when disagreement between the number of said provisional IDs and the total number of said tires of the vehicle is recognized in said provisional ID number judging step, wherein said authorized ID registering step includes a step of registering a plurality of provisional IDs as authorized IDs considering said priority order as much as a total number of tires actually installed on the vehicle wheels, when elapse of said predetermined time is recognized by said elapsed time judging step.

39. A program executed in a computer constituting a control unit of a pneumatic tire pressure monitoring apparatus for monitoring the air pressure of tires belonging to its own vehicle based on signals transmitted from transmitters associated with said tires, comprising:

a receiving step of receiving a signal from each transmitter;

an identification (ID) checking step of judging whether an ID contained in the signal received from said each transmitter agrees with an already registered ID, when the signal from said each transmitter is received in said receiving step;

an air-pressure judging step of judging whether there is any abnormality in an air pressure of a tire equipped with said each transmitter based on air-pressure data contained in the signal received from said each transmitter, when agreement between the ID contained in the signal received from said each transmitter and said already registered ID is recognized in said ID checking step;

a warning step of executing a predetermined warning operation, when any abnormality in the air pressure of the tire equipped with said each transmitter is found in said air-pressure judging step;

a traveling condition judging step of judging whether the vehicle is traveling or stopped, when disagreement between the ID contained in the received signal and said already registered ID is recognized in said ID checking step;

a provisional ID registering step of registering the ID being judged as disagreeing with said already registered ID in said ID checking step as a provisional ID, when stoppage of said vehicle is recognized in said traveling condition judging step;

a provisional ID judging step of judging whether the ID contained in the received signal agrees with said provisional ID, when traveling of said vehicle is recognized in said traveling condition judging step;

an increasing pattern judging step of judging whether at least one of pressure and temperature data contained in said received signal is in an increasing pattern, when agreement between the ID contained in the received signal and said provisional ID is recognized in said provisional ID judging step; and a warning objective excluding step of excluding said ID contained in the received signal from warning objectives in said warning step, when no increasing pattern of at least one of pressure and temperature data contained in said received signal is recognized in said increasing pattern judging step.

40. The pneumatic tire pressure monitoring program in accordance with claim 39, further comprising:

a pattern agreement judging step of executing said increasing pattern judging step when the ID contained in said received signal agrees with said already registered ID, and judging whether or not said at least one of pressure and temperature data contained in said received signal agrees with an increasing pattern of at least one of temperature and pressure in a present traveling pattern of the vehicle, when the increasing pattern is recognized in said at least one of pressure and temperature data contained in said received signal; and a warning object setting step of setting said ID contained in the received signal as one of warning objectives in said warning step, when said at least one of pressure and temperature data contained in said received signal agrees with the increasing pattern of at least one of temperature and pressure in the present traveling pattern of the vehicle.

* * * * *